US009022850B2

(12) United States Patent
Acres

(10) Patent No.: US 9,022,850 B2
(45) Date of Patent: May 5, 2015

(54) METHOD AND APPARATUS FOR SELECTIVELY INDICATING WIN PROBABILITY

(71) Applicant: Patent Investment & Licensing Company, Las Vegas, NV (US)

(72) Inventor: John F. Acres, Las Vegas, NV (US)

(73) Assignee: Patent Investment & Licensing Company, Las Vegas, NV (US)

( * ) Notice: Subject to any disclaimer, the term of this patent is extended or adjusted under 35 U.S.C. 154(b) by 64 days.

(21) Appl. No.: 13/779,493

(22) Filed: Feb. 27, 2013

(65) Prior Publication Data

US 2013/0184043 A1 Jul. 18, 2013

Related U.S. Application Data

(63) Continuation of application No. 12/389,309, filed on Feb. 19, 2009, now Pat. No. 8,398,474, and a continuation-in-part of application No. 12/037,295, filed on Feb. 26, 2008, now abandoned.

(51) Int. Cl.

| | |
|---|---|
| ***A63F 3/08*** | (2006.01) |
| ***G06Q 20/00*** | (2012.01) |
| ***G07F 17/32*** | (2006.01) |

(52) U.S. Cl.

CPC .............. *G07F 17/326* (2013.01); *G07F 17/32* (2013.01)

(58) Field of Classification Search

USPC .............................. 463/16; 273/138.1, 143 R

See application file for complete search history.

(56) References Cited

U.S. PATENT DOCUMENTS

| | | | | |
|---|---|---|---|---|
| 5,280,909 | A | | 1/1994 | Tracy |
| 5,292,127 | A | | 3/1994 | Kelly et al. |
| 5,342,049 | A | | 8/1994 | Wichinsky et al. |
| 5,560,603 | A | | 10/1996 | Seelig et al. |
| 5,743,523 | A | | 4/1998 | Kelly et al. |
| 5,788,573 | A | | 8/1998 | Baerlocher et al. |
| 5,816,918 | A | | 10/1998 | Kelly et al. |
| 5,823,874 | A | | 10/1998 | Adams |
| 5,823,875 | A | | 10/1998 | Tarantino |
| 5,848,932 | A | | 12/1998 | Adams |
| 5,911,418 | A | | 6/1999 | Adams |
| 5,941,773 | A | | 8/1999 | Harlick |
| 5,980,384 | A | * | 11/1999 | Barrie ............................ 463/16 |
| 6,224,482 | B1 | | 5/2001 | Bennett |
| 6,231,445 | B1 | | 5/2001 | Acres |
| 6,254,483 | B1 | | 7/2001 | Acres |
| 6,322,309 | B1 | | 11/2001 | Thomas et al. |
| 6,358,146 | B1 | | 3/2002 | Adams |
| 6,446,964 | B1 | | 9/2002 | Kelly et al. |
| 6,491,296 | B2 | | 12/2002 | Kelly et al. |
| 6,575,832 | B1 | | 6/2003 | Manfredi et al. |
| 6,605,000 | B2 | | 8/2003 | Adams |
| 6,645,068 | B1 | | 11/2003 | Kelly et al. |
| 6,769,986 | B2 | | 8/2004 | Vancura |

(Continued)

FOREIGN PATENT DOCUMENTS

EP 1076321 A1 2/2001

*Primary Examiner* — Telly Green
*Assistant Examiner* — Tsz Chiu
(74) *Attorney, Agent, or Firm* — Marger Johnson & McCollom PC

(57) ABSTRACT

Each play of a base game increases the likelihood of winning a bonus award. A display provides a graphical indication of the change in likelihood of winning the bonus award. In one aspect, the bonus award comprises the opportunity to play a secondary game.

9 Claims, 28 Drawing Sheets

(56) References Cited

U.S. PATENT DOCUMENTS

| | | | | |
|---|---|---|---|---|
| 6,827,646 | B2 | 12/2004 | Adams | |
| 6,851,674 | B2 | 2/2005 | Pierce et al. | |
| RE38,812 | E | 10/2005 | Acres et al. | |
| 6,984,173 | B1 | 1/2006 | Piechowiak et al. | |
| 7,069,184 | B1 | 6/2006 | Barger et al. | |
| 7,100,916 | B2 | 9/2006 | Kelly et al. | |
| 7,144,321 | B2 | 12/2006 | Mayeroff | |
| 7,278,635 | B2 | 10/2007 | Kelly et al. | |
| 7,303,469 | B2 | 12/2007 | Kaminkow | |
| 7,311,304 | B1 | 12/2007 | Kelly | |
| 7,621,809 | B2 | 11/2009 | Baerlocher et al. | |
| 7,742,972 | B2 * | 6/2010 | Lange et al. | 705/37 |
| 7,780,520 | B2 | 8/2010 | Baerlocher | |
| 8,012,008 | B2 * | 9/2011 | Sato | 463/11 |
| 2003/0078101 | A1 | 4/2003 | Schneider et al. | |
| 2004/0002372 | A1 | 1/2004 | Rodgers et al. | |
| 2004/0053660 | A1 | 3/2004 | Webb et al. | |
| 2004/0072608 | A1 | 4/2004 | Toyoda | |
| 2005/0026678 | A1 | 2/2005 | Kaminkow | |
| 2005/0119052 | A1 | 6/2005 | Russell et al. | |
| 2005/0148383 | A1 | 7/2005 | Mayeroff | |
| 2005/0159211 | A1 | 7/2005 | Englman | |
| 2005/0164764 | A1 | 7/2005 | Ghaly | |
| 2005/0181860 | A1 | 8/2005 | Nguyen et al. | |
| 2005/0239531 | A1 | 10/2005 | Osawa | |
| 2006/0003825 | A1 | 1/2006 | Iwasaki et al. | |
| 2006/0003826 | A1 | 1/2006 | Walker et al. | |
| 2006/0003835 | A1 | 1/2006 | Olive | |
| 2006/0025201 | A1 | 2/2006 | Van Asdale | |
| 2006/0035705 | A1 | 2/2006 | Jordan et al. | |
| 2006/0040723 | A1 | 2/2006 | Baerlocher et al. | |
| 2006/0040735 | A1 | 2/2006 | Baerlocher | |
| 2006/0073877 | A1 | 4/2006 | Rodgers et al. | |
| 2006/0073881 | A1 | 4/2006 | Pryzby et al. | |
| 2006/0084496 | A1 | 4/2006 | Jaffe et al. | |
| 2006/0217176 | A1 | 9/2006 | Walker et al. | |
| 2007/0054727 | A1 | 3/2007 | Garamendi et al. | |
| 2007/0054733 | A1 | 3/2007 | Baerlocher | |
| 2007/0111776 | A1 | 5/2007 | Griswold et al. | |
| 2007/0218982 | A1 | 9/2007 | Baerlocher | |
| 2008/0007002 | A1 * | 1/2008 | Frankel et al. | 273/292 |
| 2008/0045288 | A1 | 2/2008 | Moshal et al. | |
| 2008/0090651 | A1 | 4/2008 | Baerlocher | |
| 2008/0125211 | A1 | 5/2008 | Plowman | |
| 2008/0139274 | A1 | 6/2008 | Baerlocher | |
| 2008/0207313 | A1 | 8/2008 | Acres | |
| 2008/0227511 | A1 * | 9/2008 | Sato | 463/11 |
| 2009/0048012 | A1 | 2/2009 | Patel et al. | |
| 2009/0093300 | A1 * | 4/2009 | Lutnick et al. | 463/26 |
| 2009/0149243 | A1 * | 6/2009 | Naicker et al. | 463/25 |
| 2009/0270168 | A1 | 10/2009 | Englman et al. | |
| 2010/0234089 | A1 | 9/2010 | Saffari et al. | |

* cited by examiner

METHOD AND APPARATUS FOR SELECTIVELY INDICATING WIN PROBABILITY

CROSS-REFERENCE TO RELATED APPLICATION

This application is a continuation of Ser. No. 12/389,309, filed Feb. 19, 2009, which is a continuation-in-part of U.S. patent application Ser. No. 12/037,295, filed Feb. 26, 2008. The contents of the foregoing application is hereby incorporated herein for all purposes.

FIELD OF THE INVENTION

This invention relates to novel methods of awarding bonus awards on games of chance.

BACKGROUND OF THE INVENTION

Playing games of chance is a popular recreational activity. There are many types of games of chance including table games where players wager against a live dealer such as blackjack, Pai Gow, roulette, Baccarat. Other types of games of chance are offered as automated machines. Examples include slots, poker, bingo, etc. Still other types of games of chance allow players to wager against one another, such as a poker table. In return for a wager, games of chance generate randomly determined outcomes, some of which result in a winning event. Games of chance are often played with wagers having financial value but some games of chance are played with points or other freely available currency having no fiscal worth.

Games of chance may be played in casinos, or at home using electronic devices or mechanical equipment. Gambling via Internet, whether for fun or for money, is also a popular activity.

Games of chance typically associate a winning event with a specific game outcome. For example, achievement of BAR BAR BAR on the payline of a three reel slot machine might pay 20 credits on a 1 credit wager. To increase player interest, bonus awards which are won independently of any single game outcome are sometimes offered. The "mystery" bonus is a popular bonus award that is so named because players cannot easily discern why the award occurred, as it is completely independent of the game's normal schedule of payments.

Mystery bonuses are awarded as a function of game play and are increasingly likely to be won with each game played. FIG. 1*a*, FIG. 1*b*, and FIG. 2 are indicative of prior art mystery bonus award operation. Here the mystery award is a progressive amount because it grows in value as a function of each wager made until it is won. Once won, the award is initialized to a starting value and the process begins again. FIG. 1*a* depicts the initialization procedure which is executed once upon inception of the mystery award and executed again after each winning occurrence of the mystery award.

A mystery progressive award is defined by a starting and ending (maximum) value. The award must be won before the award grows larger than the maximum value. A winning number W is randomly selected from within the range of all numbers between the starting and ending award values. For example, a mystery progressive starts at $1,000.00 and ends at $5,000.00. A winning value W is chosen, at 110 of FIG. 1*a*, from the range numbers between $1,000.00 and $5,000.00. In this example, W=$2,431.56. The progressive award value is set to the starting value of the award range 120—which is $1,000.00—and the bonus is ready for play as depicted in FIG. 1*b*.

The current award value—$1,000.00—is displayed to players 130 and then a new wager is awaited 140. When a wager occurs, the award value is increased as a function of the wager size 150. A commonly used embodiment adds a percentage of each wager amount to AWARD. For example, AWARD=$1,000.00, a wager of $3.00 is made, and FUNCTION is 3% of wager size. AWARD now grows to $1,000.09, as 3% of $3 is 9 cents ($0.09). AWARD is then tested against W at step 160. Since $1,000.09 is less than $2,431.56, the test fails and the flow chart returns to step 130.

This process continues until cumulative play brings AWARD=$2,431.56, making comparison 160 true and the flow chart passes to step 170 where the winner is identified. The winner in this case is the person whose wager caused AWARD to grow equal to W. The winner is then paid the amount won, $2,431.56 at step 180, after which the mystery award is again initialized 190, which simply executes the steps of FIG. 1*a* again, and the process repeats.

A fixed award mystery bonus works exactly like the progressive mystery bonus award just described, except at step 180, the winner is paid the fixed amount—100 credits for example—instead of the incremented AWARD amount.

FIG. 2 is a prior art four-level progressive mystery bonus display. Enclosure 200 houses the displays and may be configured as an overhead sign, built into the gaming machine, or both. Each display, 210, 220, 230 and 240, represents one progressive mystery bonus award and each grows as a function of wagers made in any gaming machine linked to these awards. Each of the four award values has a winning number W chosen for it during initialization and each award is won independently of the others.

The range for each progressive award 250, 260, 270, and 280 are made known to players so they may understand that, as each progressive award grows, it is more likely to be won.

When one of the mystery awards is won, the winning display immediately begins to alternate every few seconds between the progressive bonus amount won and the winning machine identifier. After the award amount is paid to the winner, either automatically as credits placed on the winning machine or as a manual payment of cash or check directly to the player, the won mystery progressive award is reset to its starting value and again grows as wagers are made in the associated games of chance.

In another embodiment of the prior art, a light or other indicator is placed on, or near each machine in the link. When a win occurs, the winning machine indicator is activated, and remains active, until the award is paid. Because there are so many numbers, multi-level mystery progressives are confusing to many players and this limits their appeal. While the growing award amount, and the corresponding increased likelihood that a win will occur, creates drama and therefore enhances entertainment value to the player, the win occurrence itself is anticlimactic to everyone but the winner because the amount won is known the instant the win occurs.

DETAILED DESCRIPTION OF THE INVENTION

Figure 1A:
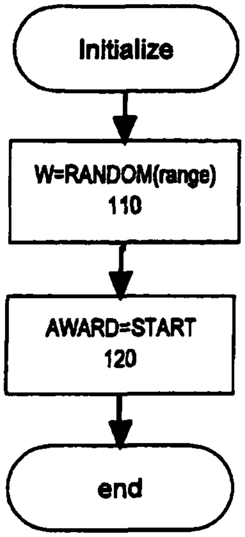
FIG. 1*a* is a prior art flow chart for initializing a progressive mystery bonus award.
Figure 1B:
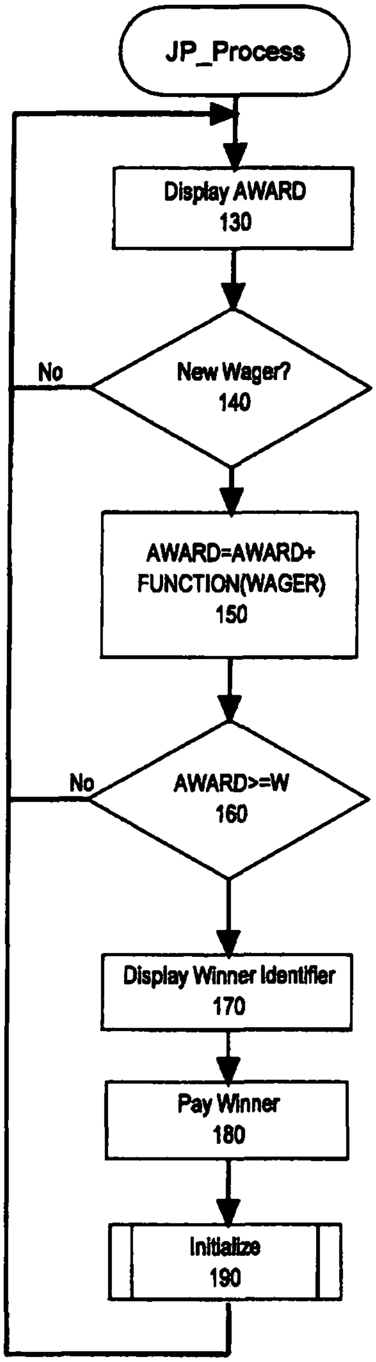
FIG. 1*b* is a flow chart for implementing a progressive mystery bonus award.
Figure 2:
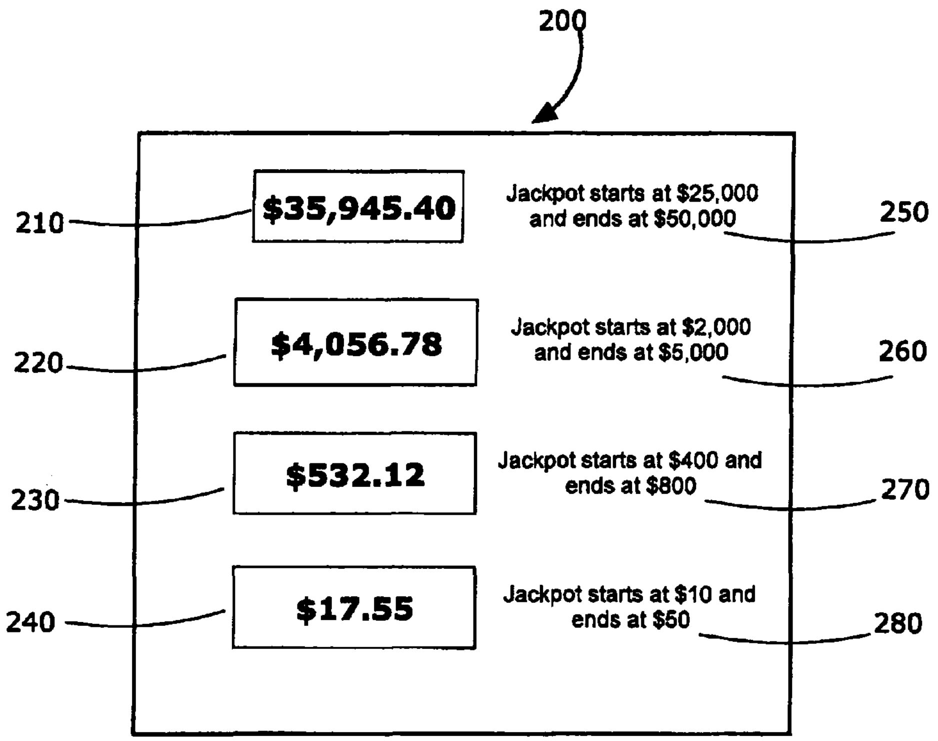
FIG. 2 illustrates a prior art four-level progressive mystery award display.

Though my invention is equally useful with table games and gaming machines, the following discussion describes its use with gaming machines only. I do this solely for clarity of explanation as the manner of operation on any game of chance—table game or gaming machine—is very similar and my claims regarding this invention should in no way be limited by this clarification. My invention is also useful in Internet gambling and computer games that simulate wagering.

The embodiments of my invention may apply to a single player or multiple players each playing a first game and possibly a second game different from the first game. The first game will generally be referred to here as a base game and the second game will generally be referred to here as a secondary game, although one having skill in the art will recognize that other naming conventions can be used.

Regardless of the number of players, a bonus award, sometimes referred to as merely an ‘award’ or merely a ‘bonus,’ may be triggered without play of a secondary game, or alternatively, a secondary game may be triggered, which in turn delivers the bonus award. The chances of triggering the bonus award or the secondary game may change—either linearly or non-linearly—in response to one or more predefined events, such as a play of the base game, an amount wagered, or in connection with an outcome of the base game, among other possibilities.

In one embodiment, a gaming device may comprise a base game and a bonus award pay table having a first range to indicate a first result and a second range to indicate a second result. A random number generator (RNG) may select a value from the bonus award pay table, and if the selected value bears a predefined relationship to either the first or second ranges of the bonus award pay table, a bonus award mechanism may award the bonus award. At anytime, the first and second ranges may change in response to one or more predefined events, such as in response to a play of the base game, an amount wagered, or an outcome of the base game, among other possibilities. For example, the bonus award may be triggered as a result of increasing or decreasing odds of hitting the bonus award after each successive play of a base game. Moreover, the bonus award may be won on every play of the base game subject to the changing odds of winning the bonus award.

In another embodiment, the gaming device may comprise a base game and a bonus award associated with one or more winning values selected from a plurality of values Y. The RNG may select one value X from the plurality of values Y and award the bonus award when the selected value X bears a predefined relationship to the one or more winning values. The predefined relationship can be, for example, where the RNG value is equal to the one or more of the winning values. At anytime, the number of the plurality of values Y may change in response to one or more predefined events, such as in response to a play of the base game, an amount wagered, or an outcome of the base game, among other possibilities. As a result, the bonus award may be won on every play of the base game subject to the changing odds of winning the bonus award.

I define “bonus award” as a system that selects awards as a function of game play events. My definition of a bonus award does not include an award that is paid simply because a single gaming machine outcome resulted in a specific result, such as BAR BAR BAR on a three reel slot machine, as that is a normal jackpot occurrence. A bonus award could be, however, paid on the 11$^{th}$ occurrence of BAR BAR BAR. It will be appreciated by one of skill in the art that there are many methods and techniques for determining when a bonus award occurs. Although I may choose to describe a particular embodiment while teaching how my invention functions, I do not limit the claims of my invention to only that embodiment.

Moreover, a bonus award may sometimes be referred to herein as merely an 'award' or merely a 'bonus.'

In addition, the winner does not have to be the person whose game play caused the winning condition to be met. The award could be paid to the tenth person that makes a wager after the win occurs, the person that placed the wager prior to the wager that met the winning condition, etc. One of ordinary skill will recognize that many such variations are possible and may be used with my invention.

Figure 3A:
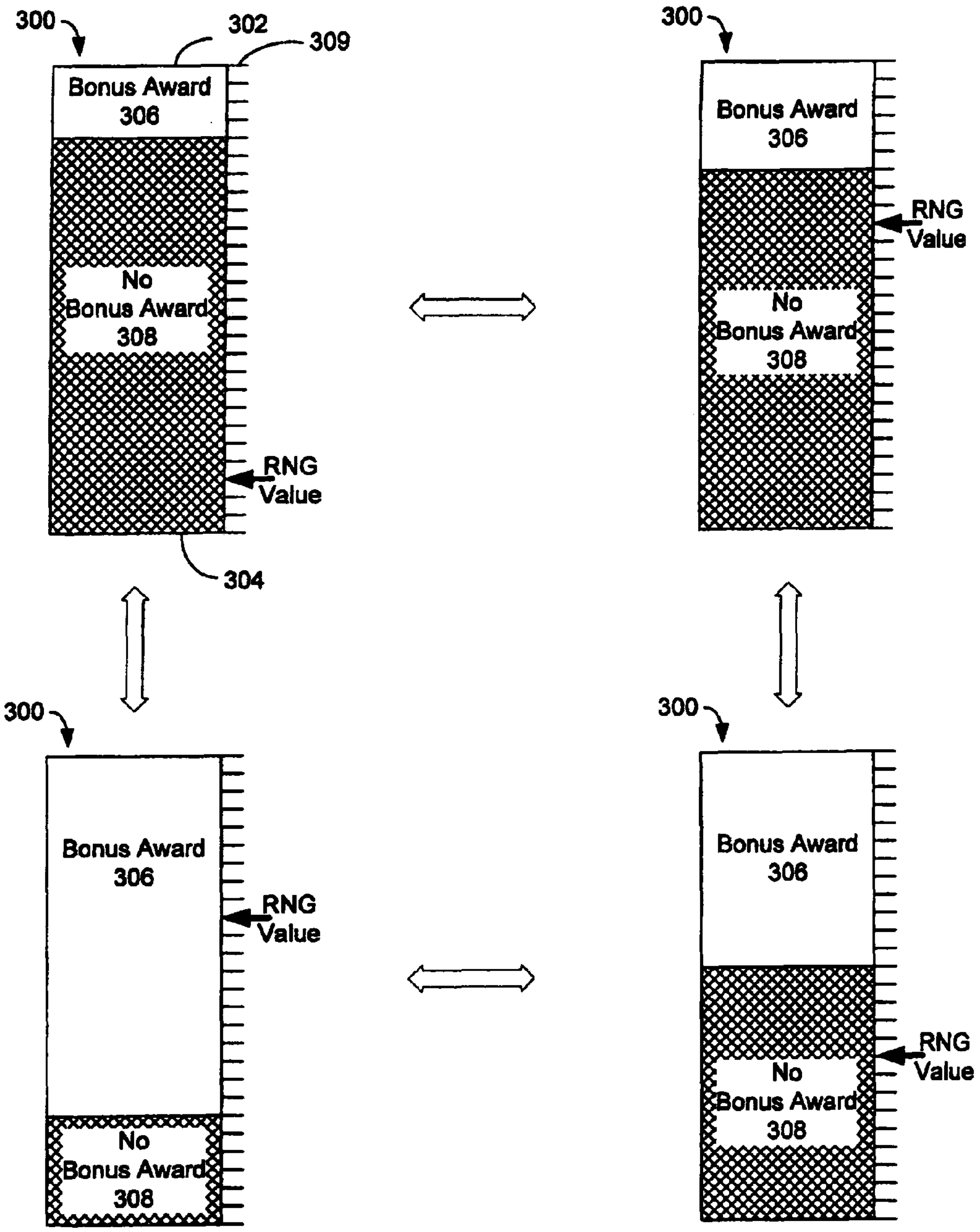
FIG. 3*a* illustrates a bonus award pay table including ranges defining different bonus award results configured to change in non-linear increments.

FIG. 3*a* illustrates a bonus award pay table 300 including ranges 306 and 308 defining different bonus award results configured to change in non-linear increments. The bonus award pay table 300 will generally be referred to herein as "table 300" for the sake of simplicity, and can comprise a table used for purposes other than for determining a bonus award. The table 300 may include a first end 302 and a second end 304. The first end 302 and second end 304 may be substantially fixed in relation to one another. While the table 300 is referred to here as a "table," one of skill in the art will readily understand that an array can be used, such as an array of numbers. The first range 306 may correspond to a first result and the second range 308 may correspond to a second result. For example, the first range 306 may correspond to a bonus award and the second range 308 may correspond to no bonus award. It is also possible that the first range 306 corresponds to no bonus award and the second range 308 corresponds to a bonus award. While only two ranges are shown in table 300, one of skill in the art will readily understand that three or more ranges can be defined therein.

The table 300 may be divided into any number of units 309. The units 309 may correspond to integers. At least one random number generator (RNG) may be configured to select a random number generated value (RNG value) corresponding to one of the units 309 of the table 300. When the selected RNG value bears a predefined relationship to either the first range 306 or the second range 308, one or more bonus award mechanisms may award a bonus award. For example, if the RNG selects an RNG value that corresponds to one of the units 309 associated with the first range 306, then a bonus award can be awarded. The bonus award may be awarded in addition to any award resulting from a base game. As previously mentioned, the bonus award may be triggered without play of a secondary game, or alternatively, a secondary game may be triggered, which in turn delivers the bonus award.

As shown in FIG. 3*a*, the first range 306 and the second range 308 may change at any time, or responsive to one or more predefined events, as later explained. The four quadrants of FIG. 3*a* show an example progression of changes to the ranges 306 and 308. For example, in the upper left quadrant, the table 300 includes the first range 306 having four units 309 and the second range 308 having twenty-two units 309. The number of units 309 shown in table 300 are exemplary—any number of units 309 can be used.

In the upper right quadrant, the table 300 includes the first range 306 having six units 309 and the second range 308 having twenty units 309. In other words, the first range 306 may increase in size and the second range 308 decrease in size, but the overall number of units 309 may remain the same. The RNG may select an RNG value from the table 300 at any time, or responsive to one or more predefined events. As shown in the change from the upper left to the upper right quadrants, even though the odds increase for selecting the RNG value from the first range 306, the actual RNG value was selected from the second range 308 as shown in both the upper left and upper right quadrants of FIG. 3*a*, indicating no bonus award in both cases.

The lower right and lower left quadrants of FIG. 3*a* show a continuation of the example progression of changes to the ranges 306 and 308 of table 300. In the lower right quadrant, the first range 306 and the second range 308 have about the same number of units 309. In the lower left quadrant, the first range 306 has a relatively larger range than any of the others shown, which can more likely result in the RNG value being selected from the first range 306 to indicate a bonus award. Indeed, the actual RNG value was selected from the first range 308 as shown in the lower left quadrant, thereby indicating the bonus award. The bidirectional arrows between the different phases of the table 300 indicate that the ranges may increase or decrease after each of a series of events, and by any number of units 309.

The predefined event or events mentioned above—relating to either changing the ranges of the table 300 or selecting the RNG value—may be associated with a base game. For example, the predefined event may be associated with each play of the base game, an amount wagered, or an outcome of the base game. The predefined event may be an event that occurs before, during, or after each play of the base game. The RNG may select the RNG value from the table 300 for each play of the base game, which provides the possibility of winning the bonus award on every play of the base game. In addition, either of the ranges 306 or 308 can be changed for each play of the base game, thereby changing the odds of winning the bonus award. The range 306 may increase and the range 308 may decrease. Alternatively, the range 306 may decrease and the range 308 may increase.

One of the aspects of the present invention includes the ability to change the odds of winning a bonus award responsive to a predefined number of wins or losses of the base game. For example, sometimes a casino might prefer to configure one or more gaming machines to provide a cascaded winning experience to a player. In this scenario, the first range 306 can be increased and the second range 308 can be decreased either linearly or non-linearly responsive to a successive number of wins of the base game. In other words, the odds of winning the bonus award can increase with each win of the base game. This leads to a cascading effect where the player experiences the pleasure of winning multiple times in a row.

Alternatively, the casino might prefer to configure one or more gaming machines to provide a counter-balancing winning experience to the player. In this scenario, the first range 306 can be increased and the second range 308 can be decreased either linearly or non-linearly responsive to a successive number of losses of the base game. In other words, the odds of winning the bonus award can increase with each loss of the base game. This provides a counter-balancing effect where the player may experience some losses of the base game, the losses of which can be counter-balanced by increasing odds of winning the bonus award. This may encourage the player to continue playing despite suffering losses on the base game.

In yet other embodiments, the ranges can be adjusted so that the odds of winning the bonus award can decrease either linearly or non-linearly responsive to a successive number of wins of the base game, or the odds of winning the bonus award can decrease either linearly or non-linearly responsive to a successive number of losses of the base game.

It should be understood that the successive number of wins or losses discussed above need not be chronological. For example, the ranges can be changed responsive to a predefined number of wins, not necessarily occurring chronologically in time; alternatively, the ranges can be changed responsive to a predefined number of losses, not necessarily occurring chronologically in time. And as previously discussed, the ranges can be changed responsive to one or more predefined events unrelated to the number of wins or losses of the base game.

Additional methods for changing the ranges 306 and 308, and therefore the odds of winning the bonus award, will be described in more detail with reference to FIGS. 3*b*, 3*c*, 3*d*, and 3*e*, as follows.

Figure 3B:
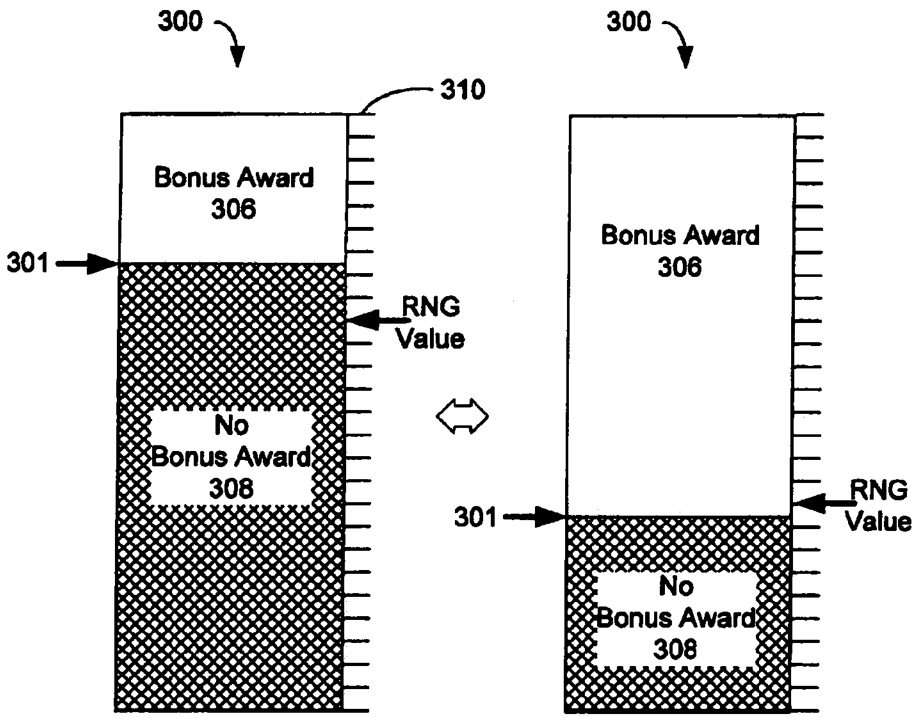
FIG. 3*b* illustrates a bonus award pay table including ranges defining different bonus award results aligned on non-integer boundaries.

FIG. 3*b* illustrates a bonus award pay table 300 including ranges 306 and 308 defining different bonus award results aligned on non-integer boundaries 301. For example, the first range 306 of table 300 can be adjusted so its boundary is at position 301, which is a non-integer position with respect to units 309. In a similar fashion to that previously described above, the RNG value can be selected to correspond to one of the units 309 associated with either the first range 306 or the second range 308 as shown in FIG. 3*b*. In other words, even though the first and second ranges 306 and 308 can be increased or decreased by non-integer or decimal values, the RNG value may nevertheless select an integer value to correspond to either the bonus-award-range or the no-bonus-award-range.

Figure 3C:
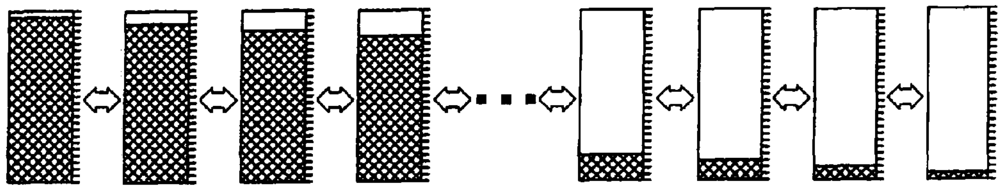
FIG. 3*c* illustrates a bonus award pay table including ranges defining different bonus award results configured to change in linear single integer increments.

FIG. 3*c* illustrates a bonus award pay table including ranges defining different bonus award results configured to change in linear single integer increments. While not specifically labeled, the reference numerals used in FIGS. 3*a*-3*b* can apply to the similar table elements of FIG. 3*c*. Here, various phases of the table show that the first range can increase linearly and the second range can decrease linearly by one integer at a time. Each phase can represent a state of the table at a given moment in time. The phase can change responsive to one or more predefined events, such as in connection with a play of the base game, an amount wagered, or an outcome of the base game, among other possibilities. The bidirectional arrows of FIG. 3*c* also illustrate that the first range can decrease linearly and the second range can increase linearly by one integer at a time.

Figure 3D:
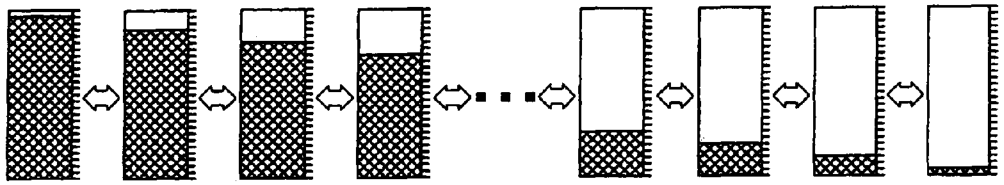
FIG. 3*d* illustrates a bonus award pay table including ranges defining different bonus award results configured to change in linear multiple integer increments.

FIG. 3*d* illustrates a bonus award pay table including ranges defining different bonus award results configured to change in linear multiple integer increments. While not specifically labeled, the reference numerals used in FIGS. 3*a*-3*b* can apply to the similar table elements of FIG. 3*d*. Here, various phases of the table show that the first range can increase linearly and the second range can decrease linearly by more than one integer at a time. Each phase can represent a state of the table at a given moment in time. The phase can change responsive to one or more predefined events, such as in connection with a play of the base game, an amount wagered, or an outcome of the base game, among other possibilities. The bidirectional arrows of FIG. 3*d* also illustrate that the first range can decrease linearly and the second range can increase linearly by more than one integer at a time.

Figure 3E:
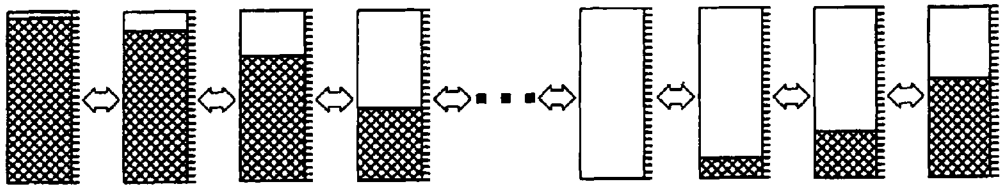
FIG. 3*e* illustrates a bonus award pay table including ranges defining different bonus award results configured to change in non-linear increments.

FIG. 3*e* illustrates a bonus award pay table including ranges defining different bonus award results configured to change in non-linear increments. While not specifically labeled, the reference numerals used in FIGS. 3*a*-3*b* can apply to the similar table elements of FIG. 3*e*. Here, various phases of the table show that the first range can increase non-linearly and the second range can decrease non-linearly by more than one integer at a time. Each phase can represent a state of the table at a given moment in time. The phase can change responsive to one or more predefined events, such as in connection with each play of the base game, an amount wagered, or an outcome of the base game, among other possibilities. The bidirectional arrows of FIG. 3*d* also illustrate that the first range can decrease non-linearly and the second range can increase non-linearly by more than one integer at a time.

Figure 3F:
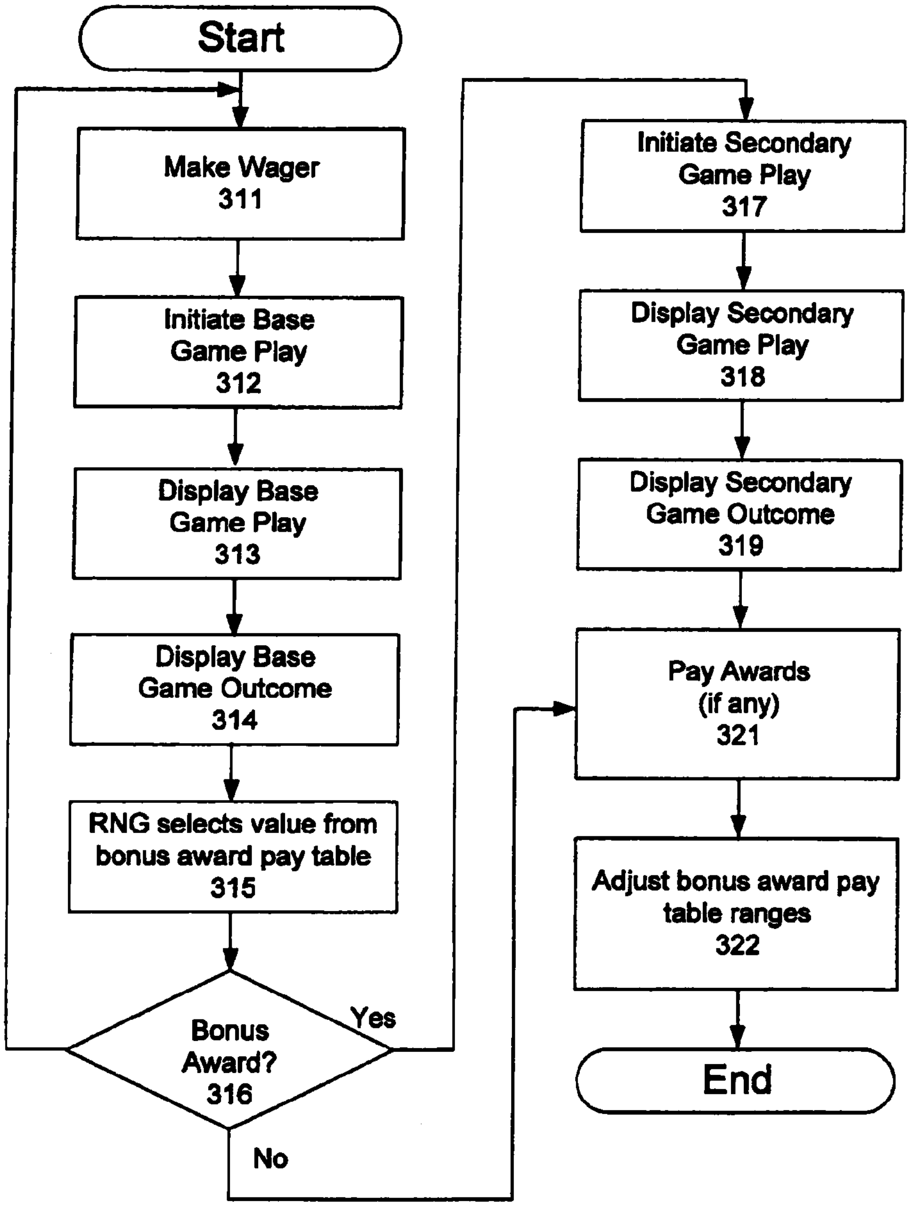
FIG. 3*f* is a flow chart of an embodiment of my invention relating to an adjustment of bonus award pay table ranges.

FIG. 3*f* is a flow chart of an embodiment of my invention relating to an adjustment of bonus award pay table ranges. One of skill in the art will readily understand that the steps in the flow chart need not occur in the order as shown, as further explained below. In one embodiment, a player begins by making a wager at 311 and initiating play of a base game at 312. The play of the base game can be displayed at 313 to the player along with the base game outcome at 314. An RNG may then select a value from a bonus award pay table at 315. In other words, the RNG may select a value that corresponds to one of the units 309 of the table 300 of FIG. 3*a*. A determination can then be made at 316 whether the selected value corresponds to the bonus award, and if so, the bonus award can be awarded.

The bonus award can include the opportunity to play a secondary game, among other possibilities. Where the bonus award includes playing the secondary game, the secondary game can be initiated at 317 and displayed during game play at 318. The outcome of the secondary game can then be displayed at 319. After the outcome of the secondary game is displayed at 319, any awards may be paid at 321. For example, any award associated with the base game may be paid in addition to any bonus award.

Alternatively, if the determination is made at 316 that the selected value does not correspond to the bonus award, then any awards of the base game can be paid at 321 without awarding the bonus award. Whatever the result of the determination at 316, the ranges of the bonus award pay table may be adjusted at 322 after paying the awards at 321. The adjustment of the ranges may either increase or decrease either linearly or non-linearly the odds of winning the bonus award. As a result, with each play of the base game comes the opportunity to win the bonus award subject to different odds. Because the RNG value may be selected in conjunction with each play of the base game, the player has a chance to win the bonus award on every play of the base game.

In another embodiment, a second value may be selected from the bonus award pay table 300. Here, a second bonus award mechanism may award the second bonus award in addition to any award resulting from the base game when the selected second value bears a predefined relationship to either the first range 306 and second range 308 of the bonus award pay table 300. Indeed, any number of values may be selected from the bonus award pay table 300 and any number of bonus awards may be awarded in addition to any awards resulting from the base game.

It should be understood that the various boxes shown in FIG. 3*f* may occur in any order. For example, the RNG may select the value from the bonus award pay table before the base game play is initiated, or even before a wager is made. Similarly, the ranges of the bonus award pay table may be adjusted before, during, or after play of the base game. Other such rearrangements of the elements of the method can also be made while still achieving the purposes and desired aspects of the invention.

Figure 3G:
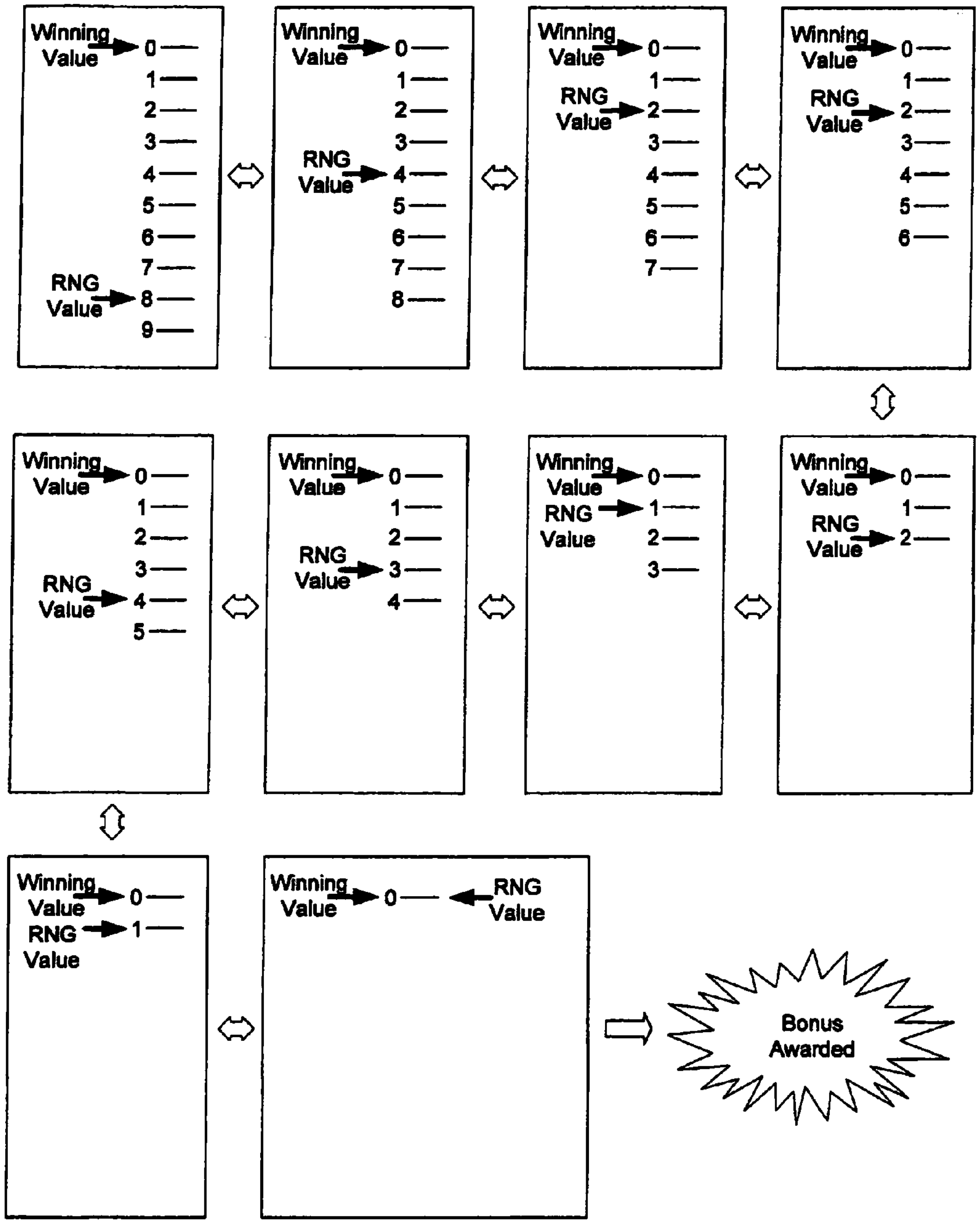
FIG. 3*g* illustrates RNG limits configured to change in linear increments, a bonus award, and a random number value.

FIG. 3*g* illustrates RNG limits of [0 . . . 9] configured to change in linear increments, a bonus award, and a random number value. One of skill in the art will readily understand that the RNG limits may have any boundary and may span any range of numbers. For the sake of simplicity in explaining and illustrating the inventive aspects of this embodiment, the RNG limits will be confined to [0 . . . 9]. A bonus award may be associated with at least one winning value selected from the RNG limits of [0 . . . 9]. At least one RNG may be configured to select an RNG value within the RNG limits of [0 . . . 9]. The RNG value may be selected either inclusive of 0 and 9 or exclusive of 0 and 9. In the examples discussed herein, it will be assumed that the RNG limits of [0 . . . 9] are inclusive. After selecting the RNG value within the RNG limits of [0 . . . 9], one or more bonus award mechanisms may be configured to award the bonus award when the selected RNG value bears a predefined relationship to the winning value. The predefined relationship can be, for example, where the selected RNG value is equal to the winning value.

Consider the various phases of the RNG limits as shown in FIG. 3*g*. The RNG limits of [0 . . . 9], or in other words, the limits or range of the RNG itself, may change at any time, or responsive to one or more predefined events. The RNG limits of [0 . . . 9] may be changed at each phase, and may experience a progression of changes. FIG. 3*g* shows the RNG limits of [0 . . . 9] changing linearly in a progression from [0 . . . 9] [0 . . . 8], [0 . . . 7], [0 . . . 6], [0 . . . 5], [0 . . . 4], [0 . . . 3], [0 . . . 2], [0 . . . 1], and finally to [0 . . . 0]. The bidirectional arrows in between each phase indicate that the RNG limits may either increase or decrease. At each phase, an RNG value may be selected from within the RNG limits, and if the RNG value corresponds to the winning value, the bonus may be awarded.

In some embodiments, the odds of winning the bonus award may be improved by changing the odds for the RNG after each play of the base game. For example, the RNG could be programmed to have a 1/200 chance of selecting the winning value after the first play of the base game and thereafter reduce the odds after each successive game in the following sequence: 1/199, 1/198, 1/197 . . . 1/1 until the secondary game is triggered. In this example, the 1/200 chance of winning may correspond to RNG limits of [0 . . . 199], the 1/199 chance of winning may correspond to RNG limits of [0 . . . 198], the 1/1 chance of winning may correspond to RNG limits of [0 . . . 0], etc.

In another variation, the odds of winning decrease with each successive play. For example, on the first play odds of 1/10 corresponding to RNG limits of [0 . . . 9] are provided for winning the secondary bonus. On the second play, odds of 1/11 corresponding to RNG limits of [0 . . . 10] are provided, etc. Odds of winning the secondary bonus could continually increase or decrease, increase or decrease until a limit was reached or increase for a period of time and then decrease and then increase again. In addition, odds could change after one or more wagers and not change after another one or more wagers. Any such sequence of successively changing odds is useful with my invention. One of ordinary skill in the art could readily implement this variation.

The bonus award may be awarded in addition to any award resulting from a base game. As previously mentioned, the bonus award may be triggered without play of a secondary game, or alternatively, a secondary game may be triggered, which in turn delivers the bonus award.

The RNG limits may change at any time, or responsive to one or more predefined events. FIG. 3*g* shows an example progression where the odds of winning the bonus award are progressively increased as the RNG limits are gradually confined to a 1/1 chance of winning. When there is a 1/1 chance of winning, the RNG value selected from within the RNG limits will correspond to the winning value, and the bonus is awarded. This is not to say that the RNG value cannot correspond to the winning value prior to reaching the 1/1 chance of winning. For example, the RNG value could theoretically correspond to the winning value on every play of the base game, however unlikely—even where the odds of winning are remote, i.e., such as 1/1000 or more.

Selecting the RNG value or adjusting the limits of the RNG itself may occur responsive to one or more predefined events. The predefined event may be associated with the base game. For example, the predefined event may be associated with each play of the base game, an amount wagered, or an outcome of the base game. The predefined event may be an event that occurs before, during, or after each play of the base game. The RNG limits may be decreased, for example, either linearly or non-linearly—and therefore the odds of winning the bonus award increased—responsive to a successive number of wins of the base game. In other words, the odds of winning the bonus award can increase with each win of the base game. This leads to the cascading effect mentioned above where the player experiences the pleasure of winning multiple times in a row.

Alternatively, the casino might prefer to configure one or more gaming machines to provide a counter-balancing winning experience to the player. In this scenario, the RNG limits can be decreased, for example, either linearly or non-linearly responsive to a successive number of losses of the base game. In other words, the odds of winning the bonus award can increase with each loss of the base game. This provides a counter-balancing effect where the player may experience some losses of the base game, the losses of which can be counter-balanced by increasing odds of winning the bonus award. This may encourage the player to continue playing despite suffering losses on the base game.

In yet other embodiments, the RNG limits can be adjusted so that the odds of winning the bonus award can decrease either linearly or non-linearly responsive to a successive number of wins of the base game, or the odds of winning the bonus award can decrease either linearly or non-linearly responsive to a successive number of losses of the base game.

It should be understood that the successive number of wins or losses discussed above need not be chronological. For example, the RNG limits can be changed responsive to a predefined number of wins, not necessarily occurring chronologically in time; alternatively, the RNG limits can be changed responsive to a predefined number of losses, not necessarily occurring chronologically in time. And as previously discussed, the RNG limits can be changed responsive to one or more predefined events unrelated to the number of wins or losses of the base game.

Figure 3H:
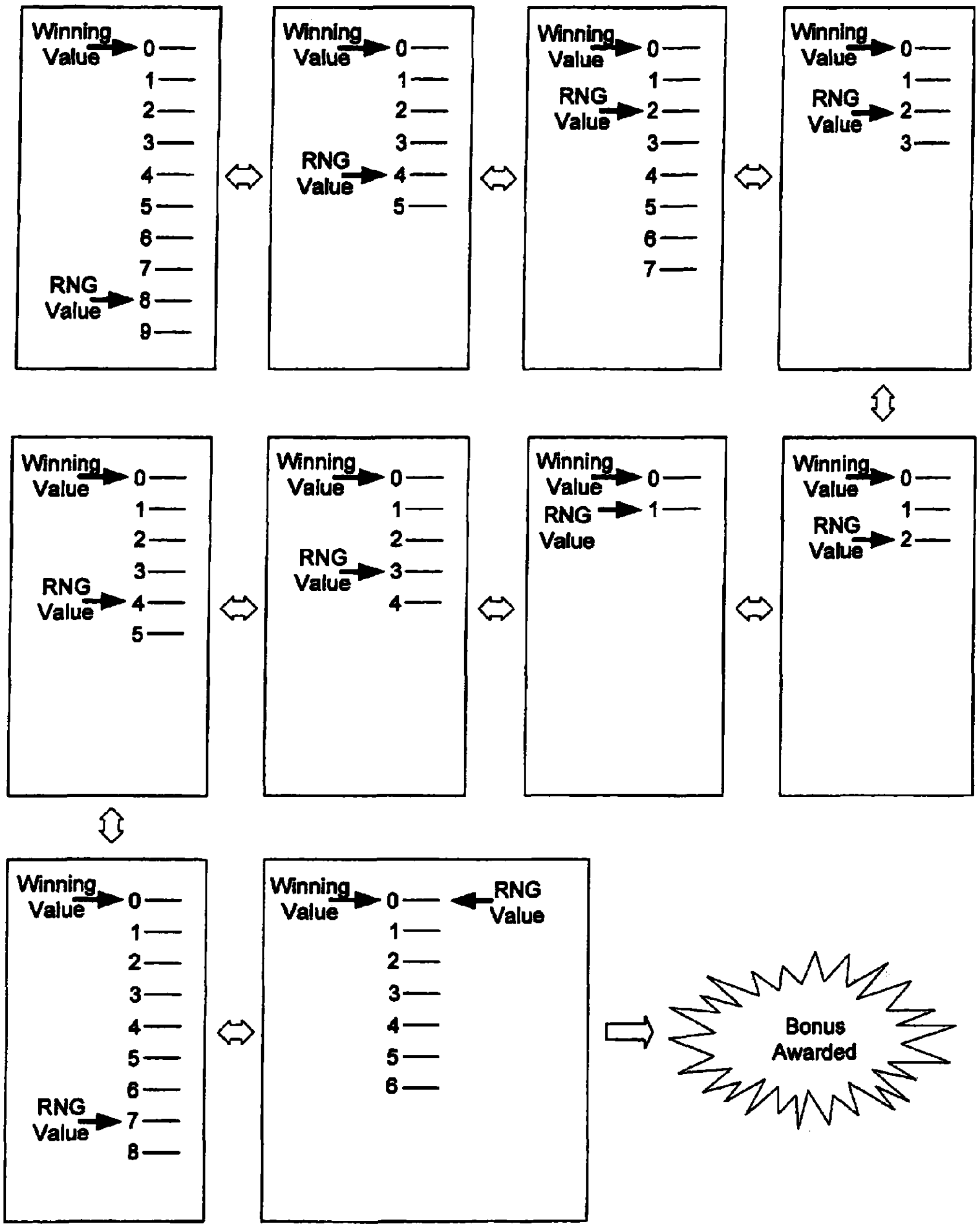
FIG. 3*h* illustrates RNG limits configured to change in non-linear increments, a bonus award, and a random number value.

FIG. 3*h* illustrates RNG limits configured to change in non-linear increments, a bonus award, and a random number value. Here, various phases of the RNG limits are shown. The RNG limits are not limited to changing in a linear single-integer manner. Rather, the RNG limits may change by more than one integer at a time, and in a linear or non-linear fashion. As shown in FIG. 3*h*, an example non-linear progression of the RNG limits, which may proceed as follows: [0 . . . 9], [0 . . . 5], [0 . . . 7], [0 . . . 3], [0 . . . 5], [0 . . . 4], [0 . . . 1], [0 . . . 2], [0 . . . 8], and finally to [0 . . . 6]. At each phase of the progression, an RNG value may be chosen from within the RNG limits at that particular phase. The changes to the RNG limits may occur responsive to one or more predefined events, such as in connection with a play of the base game, an amount wagered, or an outcome of the base game, among other possibilities.

For example, a casino may wish to adjust the odds of winning the bonus award from 1/10 to 1/6 after a particular outcome of the base game, e.g., after the player loses five plays in a row. To accomplish this adjustment, the RNG limits can be changed from [0 . . . 9] to [0 . . . 5]. The play may then have a stroke of luck with the base game resulting in two successive wins of the base game. The RNG limits may then be adjusted from [0 . . . 5] to [0 . . . 7] providing a 1/8 chance of winning the bonus award. These adjustments and other similar adjustments to the RNG limits are shown in FIG. 3*h*, and may progress in connection with the outcomes of the base game until the final box in the lower center portion of FIG. 3*h* shows that the selected RNG value corresponds to the winning value, after which the bonus is awarded.

Figure 3I:
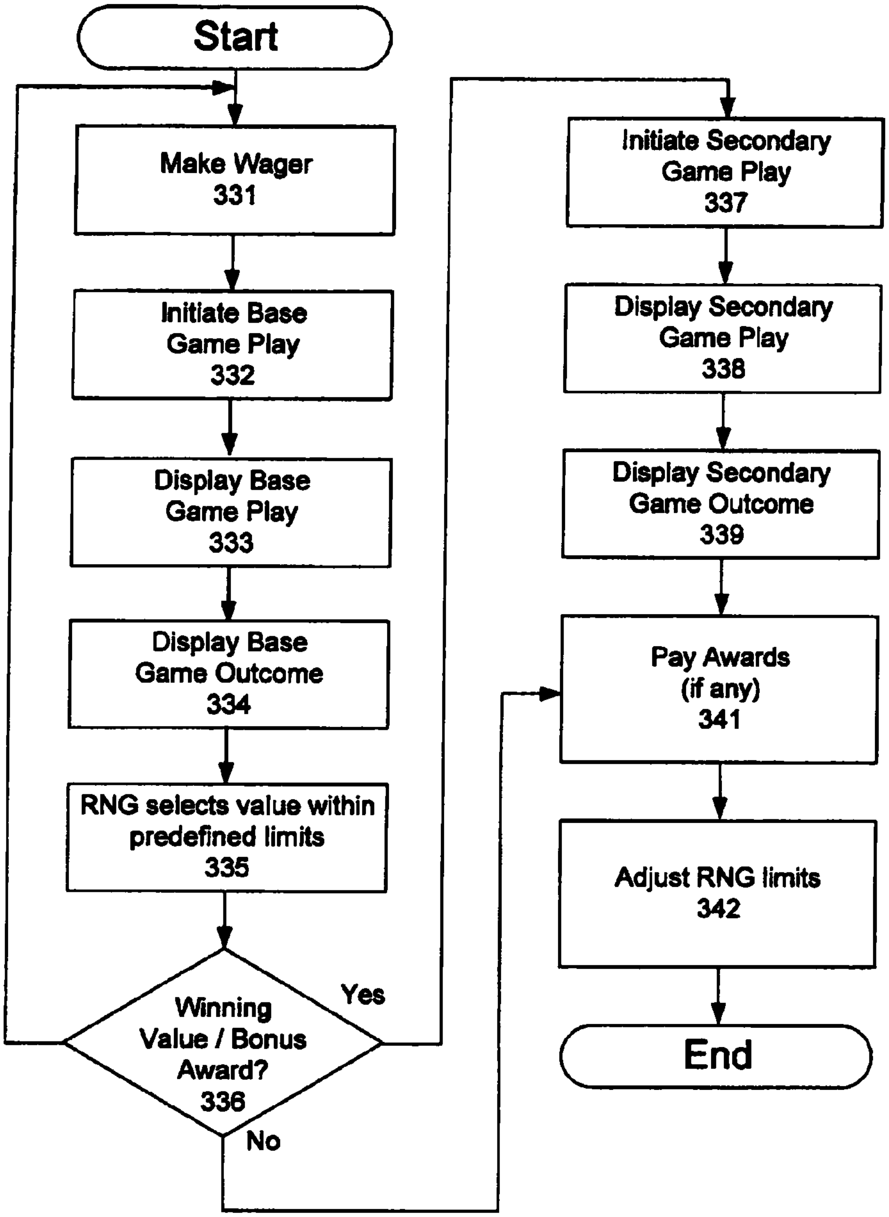
FIG. 3*i* is a flow chart of an embodiment of my invention relating to an adjustment the limits of an RNG.

FIG. 3*i* is a flow chart of an embodiment of my invention relating to adjusting the limits of an RNG. One of skill in the art will readily understand that the steps in the flow chart need not occur in the order as shown, as further explained below. In one embodiment, a player begins by making a wager at 331 and initiating play of a base game at 332. The play of the base game can be displayed at 333 to the player along with the outcome at 334. An RNG may then select a value from within predefined RNG limits at 335. In other words, the RNG may select a value that corresponds to a number within the RNG limits of [0 . . . 9]. A determination can then be made at 336 whether the selected value corresponds to the winning value, and if so, the bonus award can be awarded.

The bonus award can include the opportunity to play a secondary game, among other possibilities. Where the bonus award includes playing the secondary game, the secondary game can be initiated at 337 and displayed during game play at 338. The outcome of the secondary game can then be displayed at 339. After the outcome of the secondary game is displayed at 339, any awards may be paid at 341. For example, any award associated with the base game may be paid in addition to any bonus award.

Alternatively, if the determination at 336 is made that the selected value does not correspond to the winning value, then any awards of the base game can be paid at 341 without awarding the bonus award. Whatever the result of the determination at 336, the RNG limits may be adjusted at 342 after paying the awards at 341. The adjustment of the RNG limits may either increase or decrease either linearly or non-linearly the odds of winning the bonus award. As a result, with each play of the base game comes the opportunity to win the bonus award subject to different odds. Because the RNG value may be selected in conjunction with each play of the base game, the player has a chance to win the bonus award on every play of the base game.

In another embodiment, a second RNG value may be selected from within the RNG limits Here, a second bonus award mechanism may award the second bonus award in addition to any award resulting from the base game when the selected second RNG value bears a predefined relationship to the winning value. The predefined relationship can be, for example, where the selected second RNG value is equal to the winning value. Indeed, any number of RNG values may be selected from within the RNG limits and any number of bonus awards may be awarded in addition to any awards resulting from the base game.

It should be understood that the various boxes shown in FIG. 3*i* may occur in any order. For example, the RNG may select the value from within the RNG limits before the base game play is initiated, or even before a wager is made. Similarly, the RNG limits may be adjusted before, during, or after play of the base game. Other such rearrangements of the elements of the method can also be made while still achieving the purposes and desired aspects of the invention.

Multi-Segmented Bonus Wheels

Figure 4:
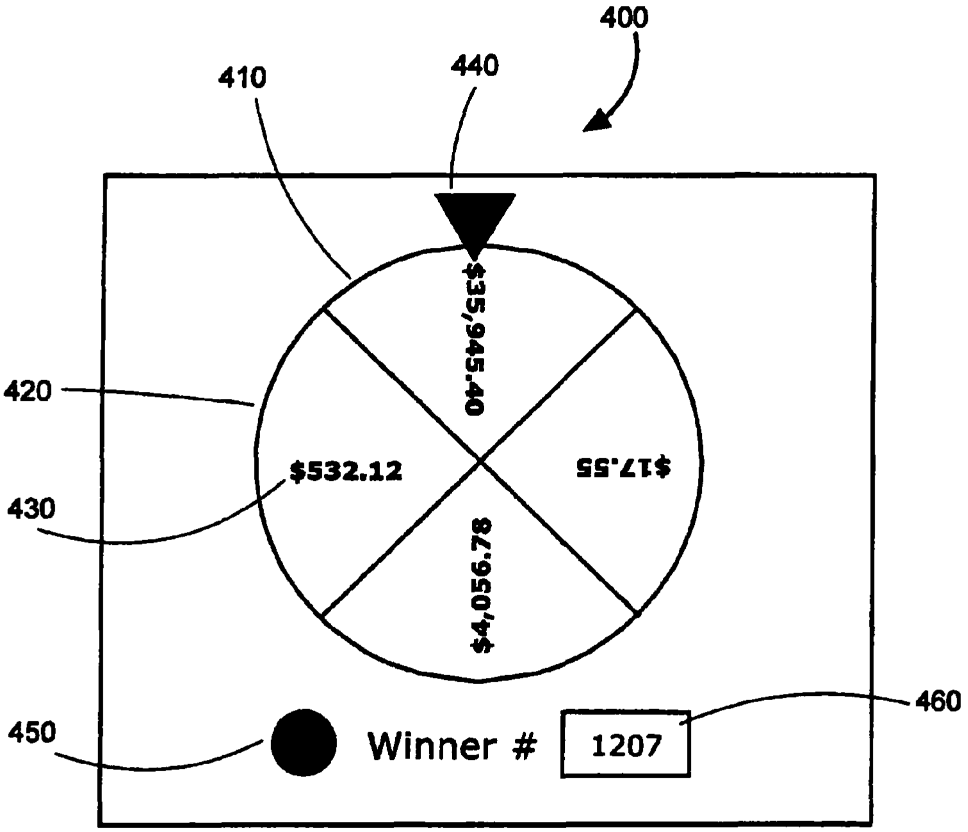
FIG. 4 illustrates a four-level progressive award using a video-based wheel indicator according to an embodiment of my invention.

FIG. 4 represents a display which is useful for implementing the steps described in the embodiments above. A video display 400 displays a wheel 410. Each wheel segment 420 holds one of the four progressive bonus award values 430. During normal play, the wheel is stationary. After a win occurs at, for example, 316 of FIG. 3*f* or 336 of FIG. 3*i*, win Indicator 450 illuminates to inform players of the win occurrence. Next, wheel 410 begins to spin. Each award amount is indicated in turn as it rotates into alignment beneath pointer 440. The wheel then slows and finally stops, indicating the award won by stopping with that amount directly beneath pointer 440. In a preferred embodiment, corresponding sound effects accompany the win occurrence, wheel spin and celebration sequence after the wheel stops.

In a preferred embodiment of my invention, the winner identity is not disclosed until a time period after the amount won is made known. Referring again to FIG. 4, winner identifier 460 delays disclosure of the winner identity until several seconds after wheel 420 comes to rest and the amount won is known.

In an alternative embodiment, the winner is identified before the winning amount is made known. In yet another embodiment, the winner identity and bonus amount won are identified simultaneously.

Win Probability Indicator

Figure 5:
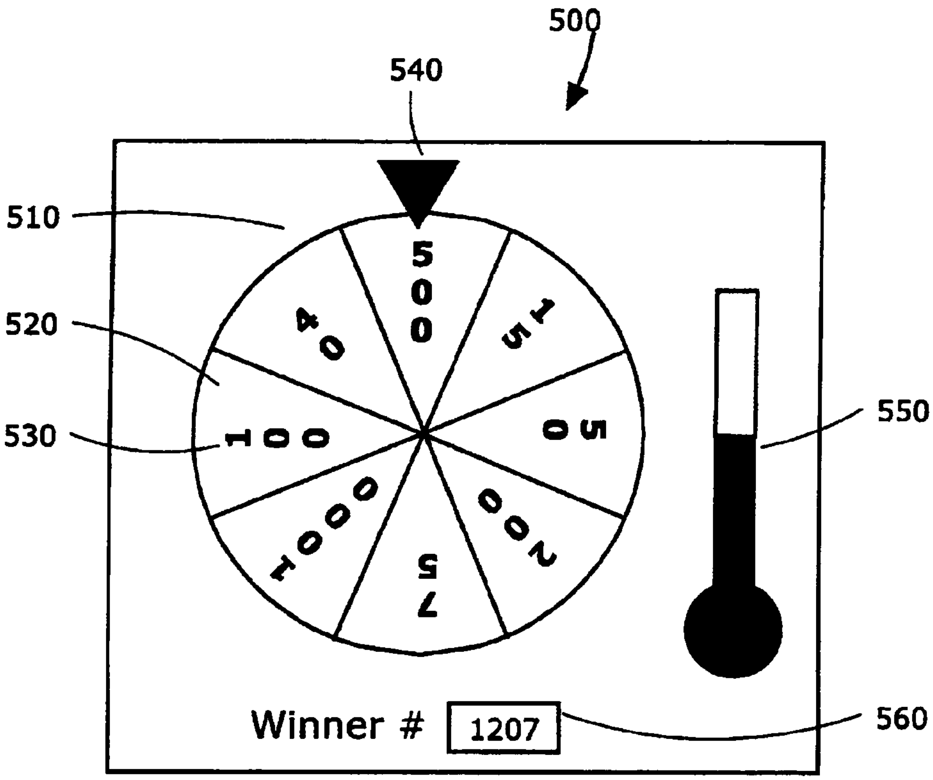
FIG. 5 illustrates an eight-level fixed-award award using a video based wheel indicator, winner identifier and win indicator according to another embodiment of my invention.

FIG. 5 is a video display of a wheel 510 which is divided into 8 segments 520, each containing a fixed award amount 530. Win probability indicator 550—which in this embodiment is shaped like a thermometer—informs players of the changing probability of awarding the bonus award, as well as announcing each winning event. Upon initiation, the thermometer is set very low, indicating a winning event is not imminent. As wagers are made, the thermometer rises, indicating a winning event is growing closer. When a winning event occurs on any of the eight bonus awards, the thermometer rises fully to the top and begins to flash, alerting players that a win occurred. After a period of time wheel 510 spins and stops, positioning the winning value beneath pointer 540. Winner identifier 560 identifies the winner and award payment is completed.

The purpose of win probability indicator 550 is to show, in a non-numeric way, that a win is growing closer or more probable with each wager.

In one embodiment, the indicator 550 displays a graphical indication of a changing probability of awarding the bonus award. Suppose that upon initialization the first range 306 of table 300 shown in FIG. 3*a* has a very small size in relation to the second range 308 causing the win probability indicator 550 to indicate its lowest value because the win is far less likely to occur.

Now presume that the first range 306 of table 300 shown in FIG. 3*a* increases responsive to one or more predefined events such as a play of a base game, an amount wagered, or an outcome of the base game. As wagers are made, the first range 306 may grow and win probability indicator 550 rises in proportion to the probability of winning the bonus award. For example, if the first range 306 subsumes the entire table 300 of FIG. 3*a*, then the win probability indicator 550 would be completely full and a win of the bonus award guaranteed on the next selection. The win probability indicator 550 may be recalculated after each wager, thereby providing players with a real sense of how likely they are to win the next bonus award.

In a similar fashion, the win probability indicator 550 can display a representation of RNG limits as illustrated in FIGS. 3*g* and 3*h*. Since the probability of winning the bonus award increases as the RNG limits decrease, the win probability indicator 550 can show an inverse relationship to the RNG limits. For example, if the RNG limits are [0 . . . X], where X represents a maximum range of the RNG, then the win probability indicator 550 can indicate its lowest value because the win is far less likely to occur.

Now presume that the RNG limits are adjusted as follows: [0 . . . X] to [0 . . . X−1], etc., [0 . . . 3], [0 . . . 2], [0 . . . 1], to [0 . . . 0] responsive to one or more predefined events such as a play of a base game, an amount wagered, or an outcome of the base game. As a result, the odds of winning the bonus award proceed as follows: 1/(X+1), 1/(X), etc., 1/4, 1/3, 1/2, to 1/1. In turn, the win probability indicator 550 rises in proportion to the probability of winning the bonus award. For example, when the probability of winning the bonus award is 1/1, then the win probability indicator 550 would be completely full and a win of the bonus award guaranteed on the next selection. As mentioned above, the win probability indicator 550 may be recalculated after each wager, thereby providing players with a real sense of how likely they are to win the next bonus award.

FIG. 5 indicates 8 different fixed-value awards. Win probability indicator 550 may represent progress toward the nearest winning occurrence. When that award is accomplished, the win probability indicator may be reset to indicate the next nearest win occurrence. Therefore win probability indicator 550 will rarely indicate its lowest value because when one win occurs, another win has also grown towards its winning value. This technique gives powerful incentive for players to continue to play and chase the next available bonus award.

Those of skill in the art will recognize these as example algorithms for using a win indicator to represent progress toward a win and that many other algorithms are possible.

Audio signals may be used to augment or replace the function of the win probability indicator, the winner identifier, or both. For example, winner identity is announced using a live or recorded voice, and win probability indicator functions are performed as a changing pitch, timbre or content of sound. One of skill in the art recognizes there are many other mechanisms by which to electronically, mechanically or electromechanically indicate the functions of the win amount, win probability, win occurrence indicator and winner identity. All such methods are useful with my invention.

Mechanical Bonus Displays & Alternative Win Probability Indicator

Figure 6:
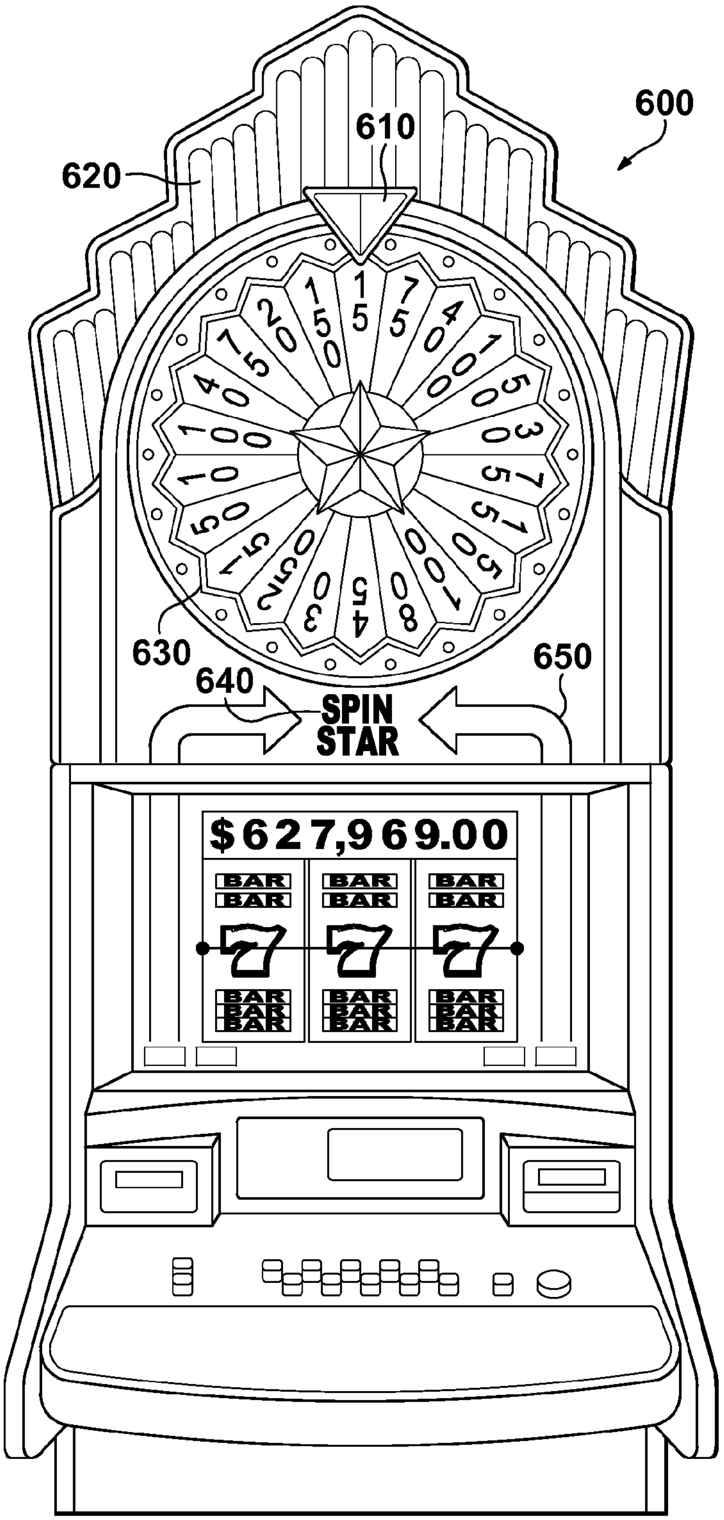
FIG. 6 illustrates a 22-level fixed award award using a mechanical wheel indicator with illuminated indications of probability of winning the next award, and illuminated indicator of wager size according to yet another embodiment of my invention.

FIG. 6 depicts a mechanical wheel embodiment of my invention implemented using a Bally CineVision gaming machine 600. Mechanical wheel 630 includes 22 segments, each containing a fixed bonus award. Pointer 610 indicates the winning amount. Win probability indicator 620 is a crown of crystals. Each crystal of the crown is equipped with a multi-color illumination source. When the game is initialized, the crown is colored an icy-blue, indicating an award is not imminent. The crown illumination turns from icy-blue to reddish to bright red as a win grows closer or more probable. When a win is struck, the crown turns red and flashes, indicating a win occurred. Those of skill in the art will recognize that other color and brightness patterns may be utilized to represent the nearness or probability of a win and that win probability indicator 620, though different in visual appearance, performs the same function as thermometer shaped win probability indicator 550 of FIG. 5 and is adaptable to the same functional embodiments.

Once a win occurs, wheel activation button 640 illuminates. When the player presses the button, wheel 630 spins, slows and ultimately stops in such a position that the won bonus amount is positioned directly beneath pointer 610.

Although the wheel depicted in FIG. 6 contains only fixed value awards, one of skill in the art readily understands that some, or all, of the fixed award values could be replaced with progressive award amounts. One skilled in the art will further understand that wheel activation button 640 could be eliminated and wheel 630 automatically spun, either immediately upon a win being struck or after a time delay. In an alternative embodiment, wheel 630 could spin after a win occurs and wheel activation button 640 is pressed or a predefined period of time has passed, whichever occurs first.

While the examples of my invention that I presented above describe a wheel rotating beneath a fixed pointer, one of skill in the art will readily understand that other methods of indicating a winning amount on a wheel are possible. For example, the wheel could remain stationary while the pointer revolves around it, much like a roulette ball rotates around a roulette table. The amount indicated on the wheel segment that is aligned with the pointer when it comes to rest is the amount won.

Alternately, the wheel and the pointer could simultaneously rotate, either in the same direction or opposite directions. The amount indicated on the wheel segment that is aligned with the pointer when both wheel and pointer come to rest is the amount won.

When a fixed pointer is used, it need not be at the top of the wheel but could be located anywhere around the circumference of the wheel. In another embodiment, a player is allowed to choose one pointer from a plurality of pointers. After pointer selection is made, the wheel is spun. The award amount that is aligned with the chosen pointer when the wheel stops is the amount won.

One of ordinary skill will readily see that my invention is useful with any of the above mentioned methods of displaying award amounts on a wheel. For example multiple pointers can be active simultaneously and the award indicated when the wheel and pointers come to rest are the amounts won. The player may win the highest value indicated by the plurality of pointers, or the player is paid the sum of all values indicated by all active pointers.

As an alternative to mechanical wheels or video depictions of wheels, the image of a segmented wheel can be backlit with one illuminator for each wheel segment. Such implementations are known in the art as light wheels. The illuminators are lit, one at a time, in sequence, to simulate rotation. Whichever segment is lit when the sequence comes to a halt is the amount won. These are but two of many other methods of illumination which can be utilized with my invention.

Wager Size Indicator

Turning again to FIG. 6, wager size indicator 650 is constructed of a number of illuminators arranged in the shape of an arrow on the right and left sides of wheel activation button 640. Each time a wager is made, these illuminators flash from the base of the arrow towards button 640. The brightness and duration of the flash is proportional to wager size. Gaming machine 600 is a three credit game, that is, players may wager one, two or three credits per game played. If three credits are wagered, illuminators 650 flash brighter and remain lit longer than if two credits are wagered. And a two credit wager causes an illumination flash that is brighter and longer-lasting that a single credit wager.

One of skill in the art understands that the shape in which the illuminators are arranged, the quantity of illuminators used and the color and brightness with which they indicate wager size and nearness to a win can be varied according to need, so long as it is demonstrated to players that larger wagers are more likely to win a bonus award than smaller wagers. Alternatively, in FIG. 6, audio cues (not shown) may be used to supplement or replace visual indicators.

Alternative Bonus Displays

Figure 7:
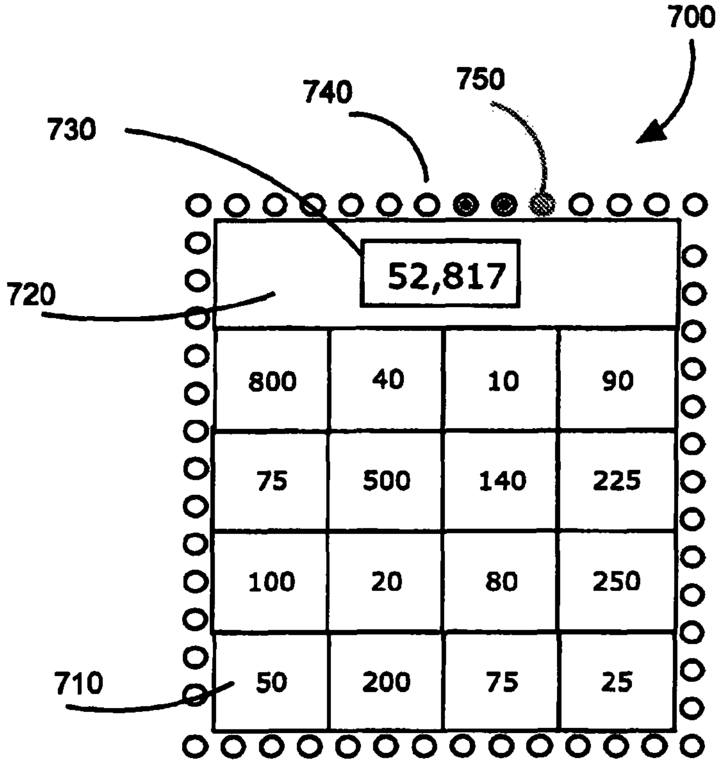
FIG. 7 illustrates a 16-level fixed-award with an additional progressive award which includes illuminators to indicate probability of winning the next award according to still another embodiment of my invention.

FIG. 7 depicts an alternate display configuration embodiment of my invention. Overhead display 700 contains sixteen separate fixed award indicators 710 and one progressive award indicator 720 which surround progressive award display 730. Each of the sixteen fixed award indicators 710 and the one progressive indicator 720 is backlit by an illuminator and each is associated, for example, with a range in table 300 indicating a bonus award such as shown in FIG. 3*a* or a winning value selected from within the RNG limits such as shown in FIGS. 3*g* and 3*h*. Until one of the seventeen awards is won, all of the illuminators behind the seventeen award indicators are turned off.

The set of award displays is surrounded by a win probability indicator implemented as individual illuminators 740. At initiation, all illuminators 740 are off. As play ensues and a win on any of the seventeen awards becomes more likely or grows closer, illuminators 740 are lit one at a time, starting at the first illuminator located clockwise of the 12 o'clock position. In the embodiment depicted in FIG. 7, the first three illuminators 750 are lit. In some embodiments, the illuminators 740 are configured to show a changing probability of winning the bonus award.

As any win grows closer or the probability of a win increases, a proportionate number of illuminators 740 are lit in clockwise sequence. The illumination sequence is conducted so that the very last illuminator 740, which is at the 12 O'clock position, is lit when a win occurs. At this time all illuminators 740 are lit, completely encircling the array of seventeen award displays. When this happens, the illuminators behind each award display 710 and 720 are lit, one at a time. After one of the award displays is lit for a brief time, it extinguishes, and another of the award illuminators 710 or 720 is lit. Each illuminator is lit in a pattern so that all illuminators are lit once in each sequence which then repeats. Over the period of a few seconds, the sequencing speed slows until only the award display that was won remains illuminated and that amount is awarded to the winning player.

Means of Implementation

Figure 8:
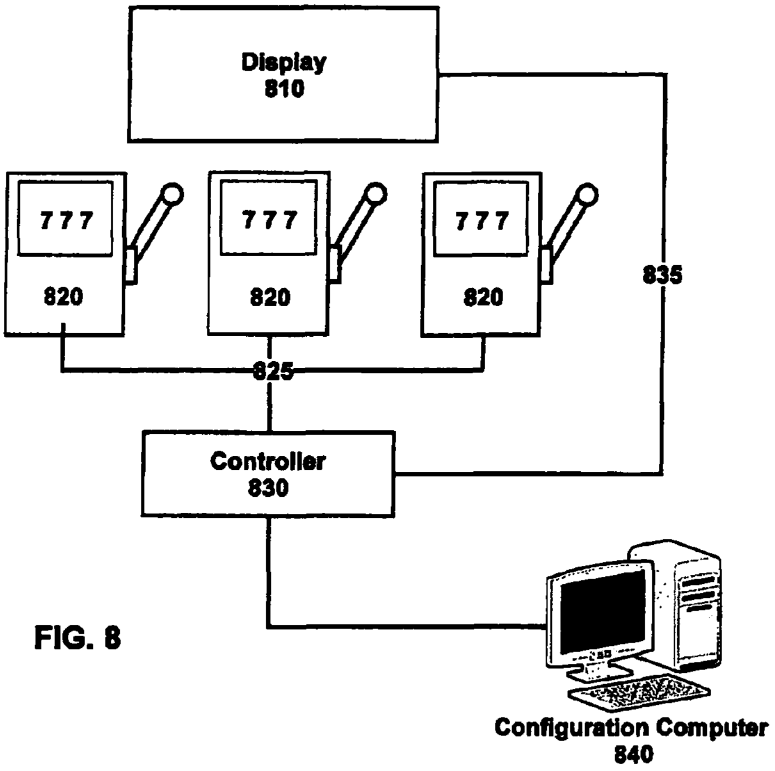
FIG. 8 is a schematic diagram of gaming machines and display device connected to an award controller according to some embodiments of my invention.
Figure 9:
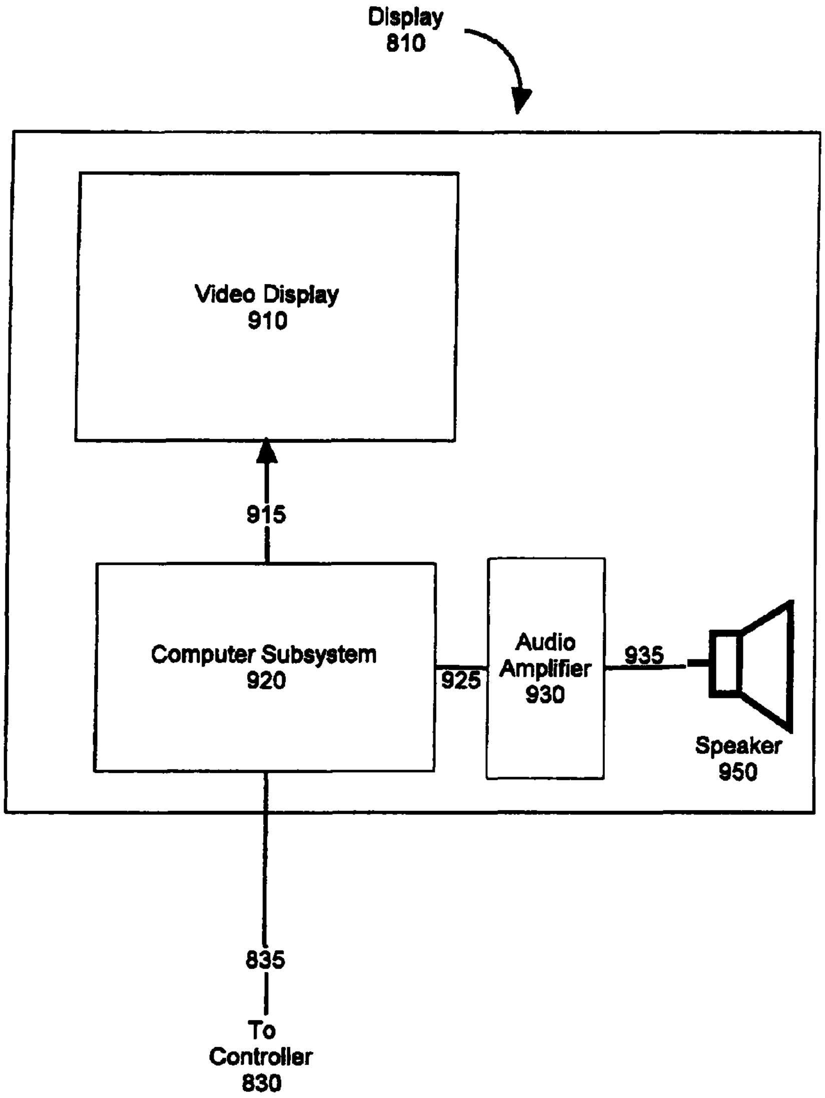
FIG. 9 is a schematic diagram of a video subsystem used as a display device according to some embodiments of my invention.
Figure 10:
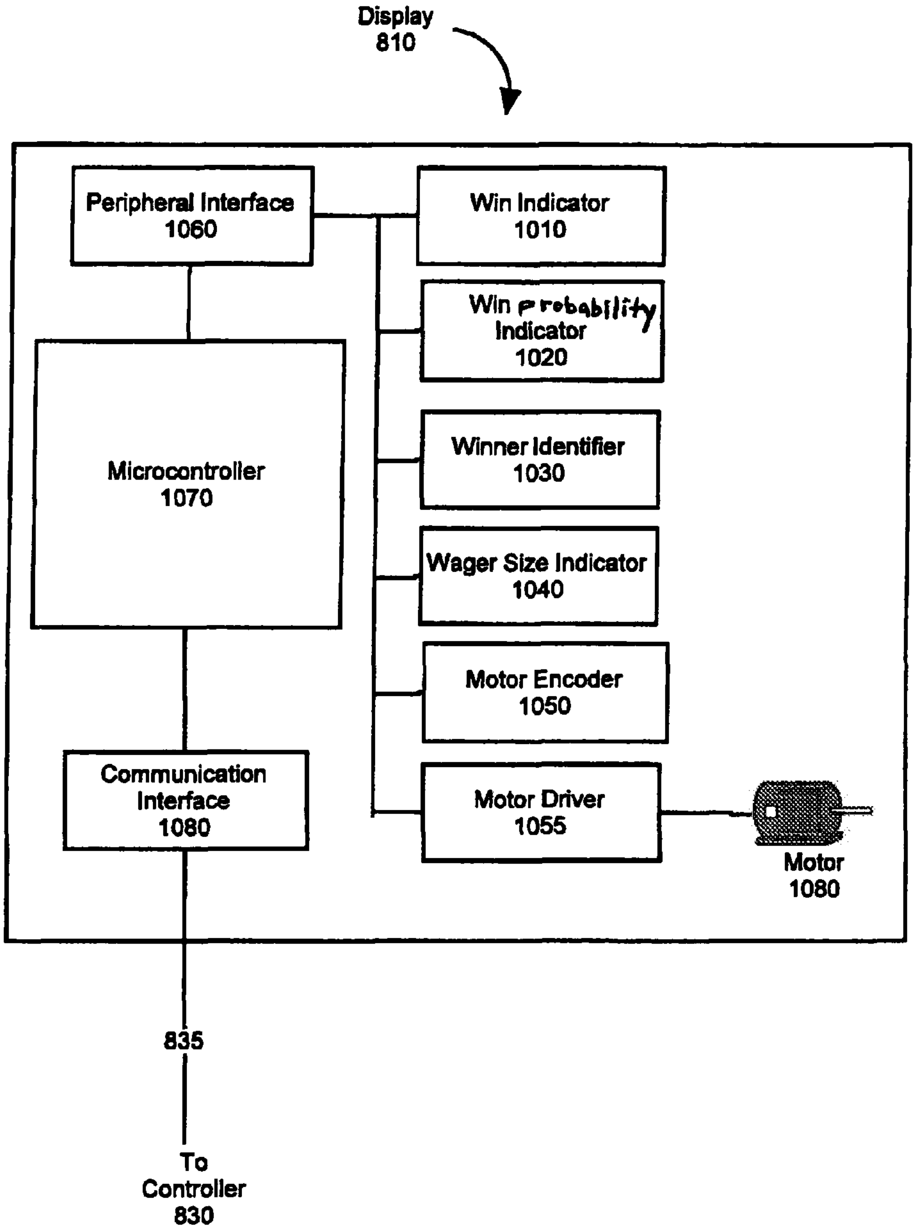
FIG. 10 is a schematic diagram of a motorized wheel, award probability indicator and wager size indicator used as a display device according to some embodiments of my invention.

Referring now to FIGS. 8-10, I now describe various means of configuring my invention. FIG. 8 depicts a schematic representation of a linked implementation of my invention. Controller 830 is configured by means of configuration computer 840 with the number of awards, the size of each, the rate of increment for each wager, and the range from which winning numbers are to be randomly selected, amongst other parameters. One of skill in the art will recognize that configuration techniques for award controllers are well known and all such configuration means may be used with this invention.

Three gaming machines 820 are shown, though any number may be used, including a single machine. Each is connected to controller 830 through connection 825. In a preferred embodiment, this connection is a two-way serial protocol capable of allowing the controller 830 to receive information about game play, including wagers made from each gaming machine and also to send payout messages to each gaming machine for payment when an award is won on that gaming machine. Examples of such two-way protocols include the well-known existing industry standard SAS protocol and the industry standard protocol in development by the Gaming Standards Association.

In yet another embodiment, connection 825 is a one-way transfer of information from each gaming machine 820 to controller 830. Such connections are less preferable because automated award payments are not supported.

Gaming machine designs sometimes utilize Ethernet, USB or other such high-speed network connections which offer the advantage of high-bandwidth and are useful for carrying information for many purposes from gaming machines to many kinds of controllers and database systems. These connections are being adapted for other casino functions such as player tracking, casino accounting and security. One of skill in the art will appreciate that such high-bandwidth connections are useful with my invention whether they are used exclusively for the purpose of transferring bonus award information or if the connection serves a variety of other purposes as well.

Connection 825 may also be implemented via wireless protocol such as Bluetooth, Zigbee, wireless Ethernet or other protocol whether based on radio frequency (RF), infrared or other technologies.

Connection 835 transfers information between controller 830 and display 810. This connection may be of a wide range of electrical protocols such as RS-232 or it may utilize more recent protocols that specify electrical, connector, cabling and information communication structure such as Ethernet or USB. One of skill in the art will appreciate that a wide variety of standard and proprietary connector, cable, electrical and information structure protocols may be used with this invention, including wireless protocols.

The transfer protocol for connection 835 may be one-way from controller 830 to display 810, or more preferably, two-way, with information flowing from controller 830 to display 810 and from display 810 to controller 830.

Although a single display is shown, multiple displays may be used and the displays may be mounted over or near a bank of gaming machines, on individual gaming machines or as remote displays away from the gaming machines to which they are associated.

In one embodiment, once controller 830 is configured and connected, information related to a predefined event such as a play of the base game, the base game outcome, or wagering information, may be transmitted from each gaming machine 820 to the controller via connection 825 where it may be used to adjust the ranges of table 300 or the RNG limits For example, in the approach involving the adjustment of RNG limits, a first base game may be associated with a first gaming device and a second base game may be associated with a second gaming device. At least one winning value associated with a bonus award may be selected within the RNG limits. At least one number generator may be configured to select an RNG value from within the RNG limits Thereafter, at least one bonus award mechanism may be configured to award the bonus award to one of the base games when the selected RNG value bears a predefined relationship to the winning value. The predefined relationship can be, for example, when the selected RNG value is equal to the winning value.

If the configuration includes progressive awards, the updated award values are transmitted to the display 810 via connection 835 for presentation to players. Information for winner identification, win probability, wager size and win occurrence may also be sent from controller 830 to display 810.

When connection 835 allows two-way communication, display 810 returns information back to controller 830, including acknowledgement that each message sent from the controller was received, diagnostic information that the display is functioning properly and other such housekeeping and award information.

Display 810 may be a video display and preferably includes a processor for rendering the required images and updating the image with information received from controller 830. Any type of video display is useful including LCD, Plasma, rear-projection DLP, CRT, LED, VFD or any other technology capable of rendering the desired image for presenting information to players about award values, win occurrences, wager sizes, win probability, etc.

FIG. 9 illustrates video display 910 connected to computer subsystem 920 via connection 915. The video display 910 is preferably a flat panel display using LCD or plasma technology as such displays are economical, widely available, long-lived and require little physical space. Of course, any other video display technology may be used.

The computer subsystem 920 is preferably a personal computer running Microsoft Windows®, Linux®, or Apple's OS X®, though other operating systems may be desirable in certain situations. The computer subsystem may render the image using Macromedia's FLASH® programming methodology or it may use alternative application software for rendering. As virtually all computers do, computer subsystem 820 includes a case, power supply, main processor such as an Intel Pentium®, a graphics coprocessor, or separate processing card such as an ASUS® EN7600GT video interface for driving the video display, standard memory such as DRAM, non-volatile memory such as a hard disk and/or CD_ROM, DVD player, flash memory, battery backed RAM or some combination therein. The operating system, applications programs and data are stored in non-volatile memory and loaded into processor memory, usually DRAM, as needed. All such computer components, and other associated components that may be optionally used, are well known to those of skill in the art and will not be further described here.

The connection 915 between computer subsystem 920 and video display 910 may be, but not limited to, VGA, DVI, HDMI, component video, or less-preferably S-video or composite video.

Another benefit of using a personal computer for video rendering is that most such computers include powerful capabilities for creating and storing audio waveforms. Connection 925 takes the output from computer subsystem 820 audio output to an audio amplifier 930. Connection 925 may be analog or digital audio signals such as optical TOSLINK or coaxial SPDIF, or other such cable for carrying monophonic, stereo, or surround sound information.

Audio amplifier 930 may be analog amplification sufficient to drive the chosen speaker or speakers 950. For example, the audio amplifier could be a two channel 50 watts RMS per channel amplifier as is readily available from many well-known sources. Alternately, the audio amplifier 930 could contain an audio processor for processing surround sound information from either the analog inputs or from digital inputs.

Speaker 950 may be a single speaker or a pair of speakers for stereo sound. Alternately, speaker 950 could be a set of speakers to implement surround sound in 5 or 7 channels, or other configuration. Each speaker channel may include a simple single cone speaker or an array of speakers for desired sound dispersion and/or improved frequency response. Subwoofers could be included for enhanced low frequency response.

Computer subsystem 920 connects to controller 830 via connection 835. Personal computers today typically include RS232, Ethernet and USB ports with a range of optional wired or wireless ports on specially configured computers or by adding an interface card to the standard personal computer.

FIG. 10 depicts a schematic representation of circuitry to enable a mechanical wheel display for use with controller 830 of FIG. 8. The video display of FIG. 9 is interchangeable in function with the mechanical wheel display of FIG. 10. One of skill in the art will recognize that these types of displays may be used together or separately and that many other types of displays are useful with my invention.

In FIG. 10, Microcontroller 1070 transmits and receives commands and information to and from controller 830 via communication interface 835. The microcomputer is connected to win indicator 1010, win probability indicator 1020, winner identifier 1030, winner size Indicator 1040, motor encoder 1050 and motor driver 1055 through peripheral interface 1060.

Win indicator 1010, win probability indicator 1020 and wager size indicator 1030 are typically arrangements of illuminators such as LEDs or light bulbs. These illuminators may be changed in brightness, color, pattern or a combination thereof as required to indicate the particular function and create excitement in a given environment. For example, the win probability indicator could be shaped as thermometer 550 of FIG. 5 a crown of lights 620 surrounding wheel 630 as depicted in FIG. 6 or individual illuminators arranged as 740 in FIG. 7.

Motor 1080 has the wheel indicator connected to its shaft and may be a DC motor, an AC motor, a stepper motor or other type of motor as fits the size and weight of the wheel and the desired control in positioning and stopping the wheel. Motor driver 1055 is used to convert signals received from microcontroller 1070, via peripheral interface 1060 into a format and capacity for driving the motor. Motor encoder 1050 provides feedback on the motor position, allowing Microcontroller 1070 to sense exactly when to stop Motor 1080 so as to indicate the correct award on the wheel.

Motor controls and wheels are well-known to those of skill in the art. The same technology that is useful in controlling the wheels used in International Game Technology's "Wheel of Fortune®" and Bally Gaming's "Monte Carlo®" may be used in my invention.

The schematic depicted in FIG. 10 is readily adaptable to controlling a reel, which is simply a wheel turned on its side and with award values disposed on its circumference, much like a slot machine reel. A payline on the front of the reel housing indicates the winning bonus amount, much like a payline on a slot machine indicates the paying symbols.

Controller 1030 may also be implemented using a personal computer or other suitable electronic control mechanism, a wide variety of which are well-known to those of skill in the art.

Figure 11:
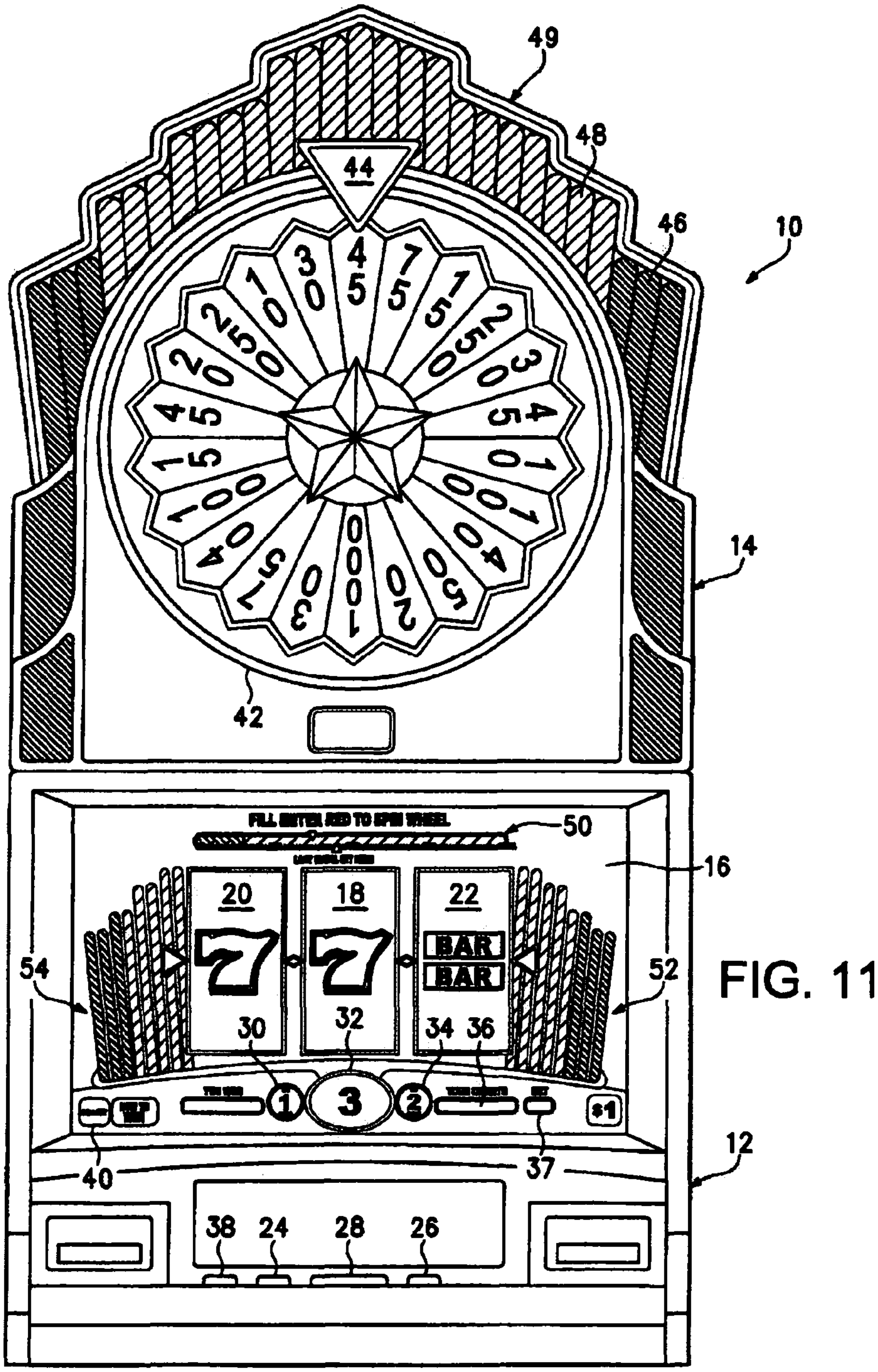
FIG. 11 is a front view of a game similar to the one depicted in FIG. 6.

Turning now to FIG. 11, indicated generally at 10 is a gaming device constructed in accordance with the present invention. The gaming device includes a base game 12 and a secondary game 14. As with the embodiment of FIG. 6, gaming device 10 incorporates a Bally CineVision gaming machine. In gaming device 10, the Bally game comprises the base game.

The Bally game includes a display 16 that comprises an LCD screen. Display 16 displays information about the outcome of the video slot game played by base game 12 in the form of three video reel symbols 18, 20, 22. It also displays, on either side and above the reel symbols, information related to the secondary game, which will shortly be described more fully.

In the present embodiment, the base game accepts wagers of one, two, or three credits. These are placed by pressing a corresponding one of buttons 24, 26, 28, respectively. Alternatively, or in addition, touch screen symbols 30, 32, 34, respectively, may be used to place a bet. Display 16 further includes a Your Credits display 36 for showing total credits on the machine, including credits applied by a player as well as credits won as a result of play. A Bet display 37 shows the amount bet on the current game. A cash-out button 38 permits a player to receive all of his or her credits on the machine at the conclusion of play. A corresponding Collect image 40 can be provided to facilitate the same function, either alternatively or in addition to button 38.

Secondary game 14 includes a rotatable mechanical wheel 42, although it should be appreciated that other types of indicators, including lighted simulations of wheels and other indications, could be equally well used. When the secondary game is enabled and played, wheel 42 rotates about an axis in the center of the wheel. A pointer 44 points to one of the awards in the segments of wheel 42 when it comes to a stop thus indicating the amount the award in the secondary game. As with the other embodiment the opportunity to play the secondary game is a bonus award that need not be tied to the outcome of the base game.

Gaming device 10 indicates in several ways how close the player is to being eligible to play the secondary game, i.e., how close or likely the bonus award is. First, illuminated polymer rods, like rods 46, 48, span the top of the gaming device above the wheel and form a semicircular lighting bank 49. In this view, rod 46 is colored red as are all other rods that are similarly designated with upper-left to lower-right cross hatching. Rod 48 is colored blue as are all other rods that are similarly designated with lower-left to upper-right cross hatching. As will be described in more detail, as the likelihood of playing the secondary game, i.e., the bonus award, becomes higher, the color of the rods progressively changes so that more become red as fewer remain blue.

The second way in which the player is informed about the probability of winning the bonus award is a meter 50, which comprises an image on display 16 above the image of reel symbols 18, 20, 22. As will also be described in more detail, a left portion of the meter is red and a right is blue with the left portion progressively moving to the right thus making the meter more red and less blue as the bonus award becomes more probable.

The third way that the player is informed about progress toward the bonus award is by images of rods 52, 54, which flank either side of the reel images and which mirror the progression in color of the polymer rods on the top of gaming device 10. Rod images 52, 54 are also hatched in the same fashion as rods 46, 48 to indicate color.

Figure 12:
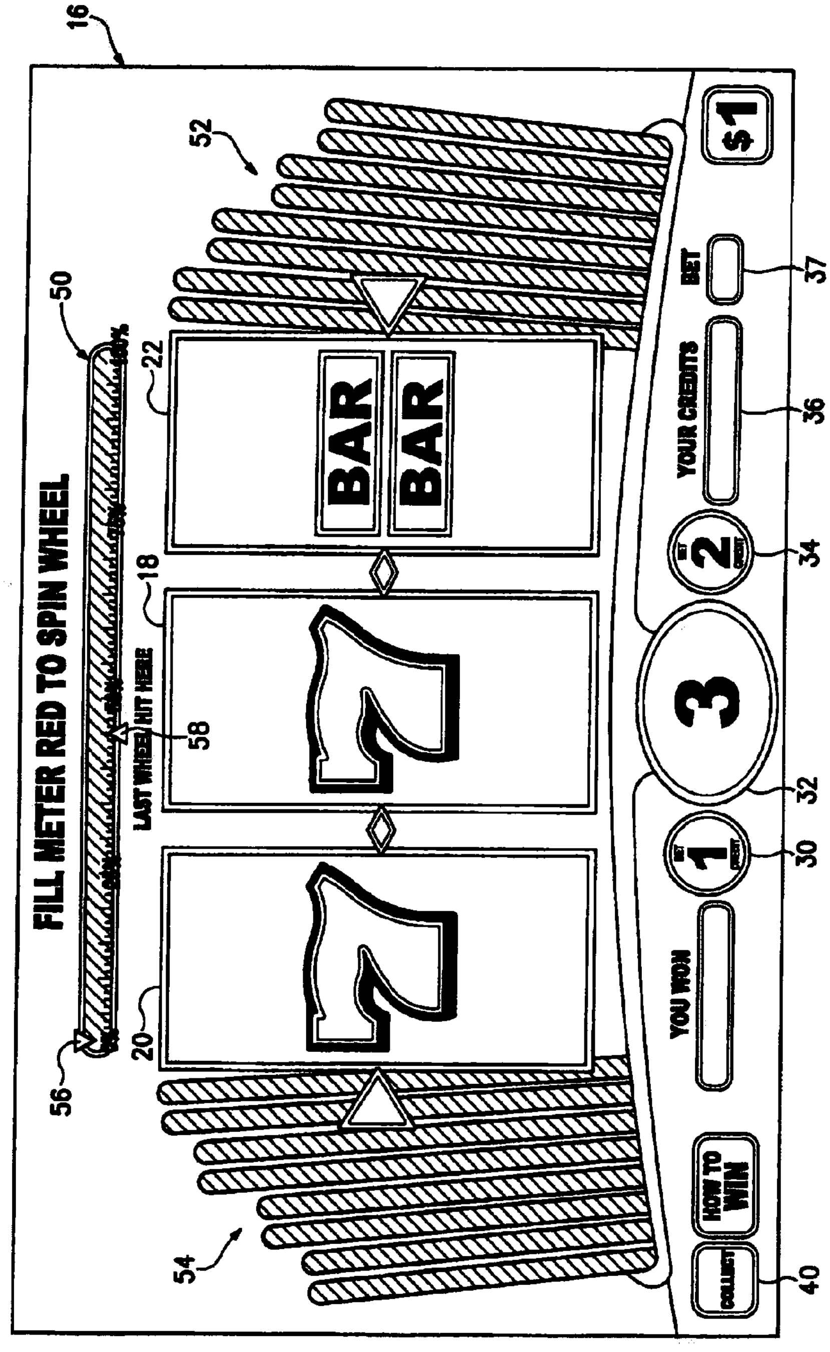
FIG. 12 is an enlarged view of a screen in the view of FIG. 11.

Consideration will now be given to play of the game from a player's perspective before description of the hardware and software to implement the game. Turning now to FIG. 12, display 16 is shown after a play of the bonus game. As a result, the meter 50 is illustrated as being all blue. It should be appreciated, however, that a bonus award round is typically started at the low end of a range defined by low and high numbers so that even after the secondary game has just been played, the red portion of the meter will indicate a starting point at zero, although the initial starting point could be above zero as well.

Meter 50 further includes pointer images 56, 58. Pointer 56 is aligned with the dividing line between the red and blue portions of the meter, thus indicating progress toward another secondary game. Pointer 58 points to the location on the meter when the last bonus award was triggered. Additional pointers, like pointer 58, could be added to indicate the location on the meter when the bonus award was triggered for the last two, three, or more secondary games.

Figure 13:
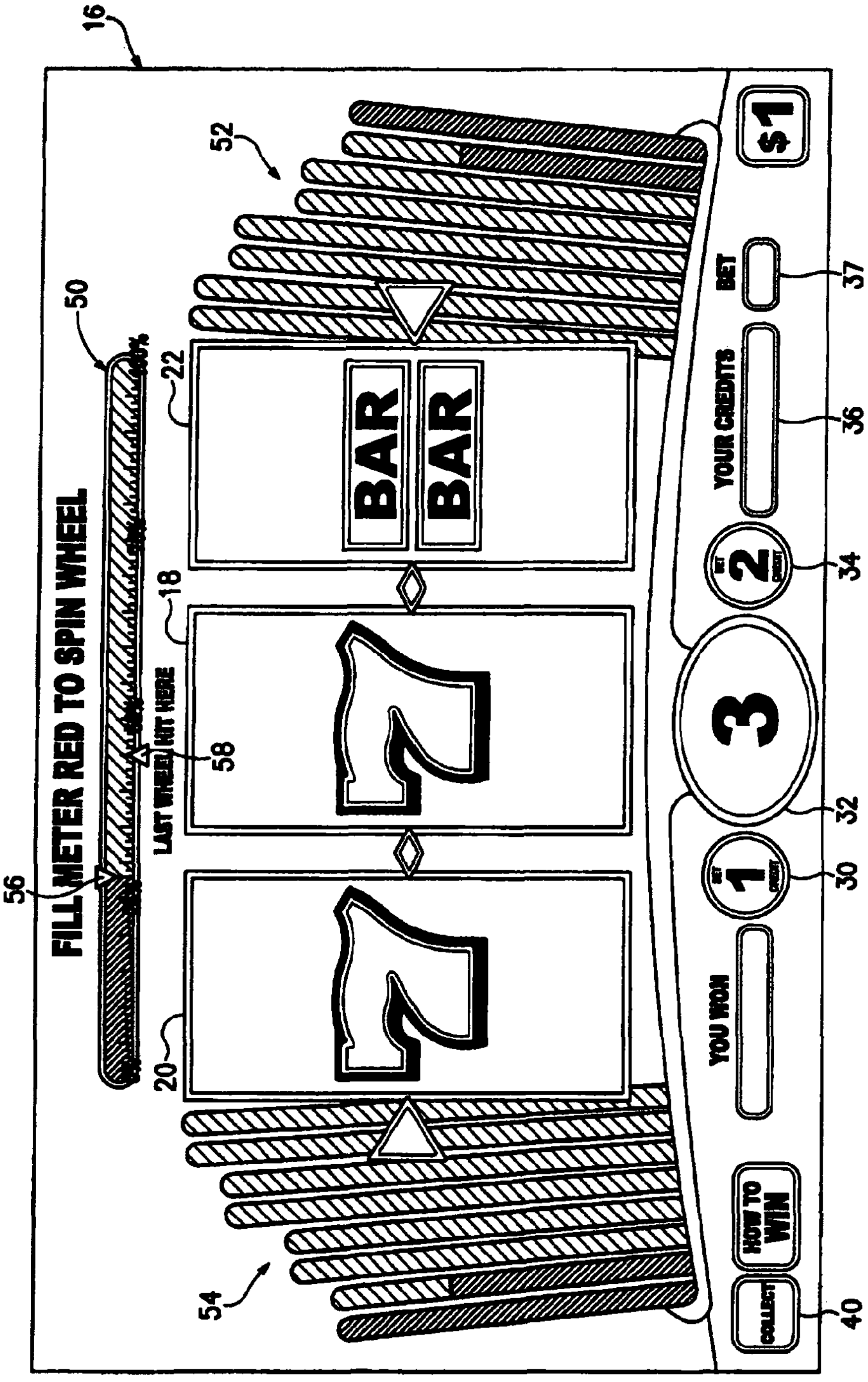
FIGS. 13-16 are views of the screen of FIG. 12 in different stages of game play.

Continuing to FIG. 13, multiple plays on base game 11 have occurred with pointer 56, as well as the red and blue images, indicating a greater likelihood of being awarded the bonus award, i.e., play of the secondary game. As will be explained more fully in connection with a description of how the game is implemented, the progression of meter 58 as play continues may provide an indication of how close the machine is to providing the bonus award or the probability of awarding the bonus award, preferably the latter.

Figure 14:
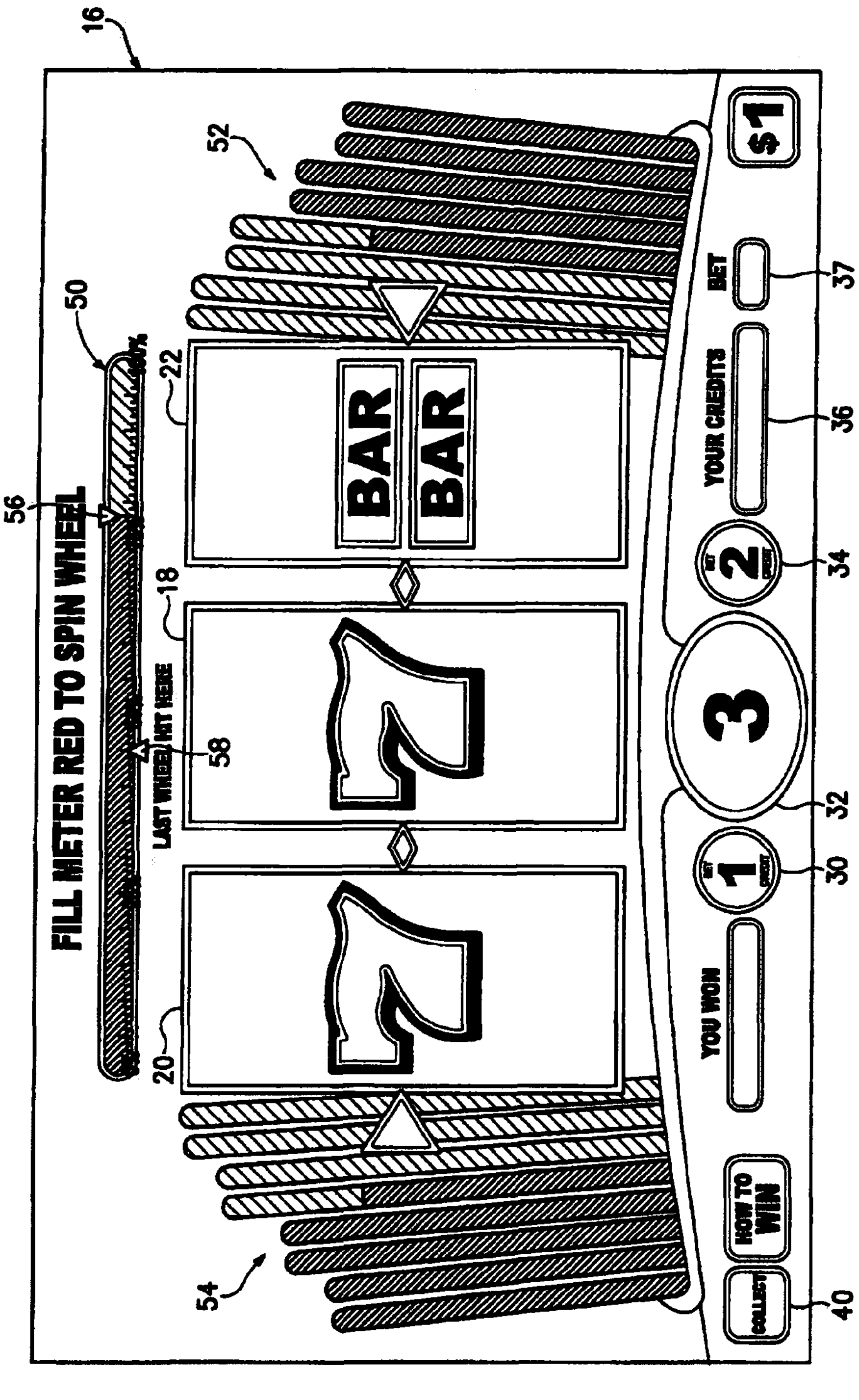
Figure 15:
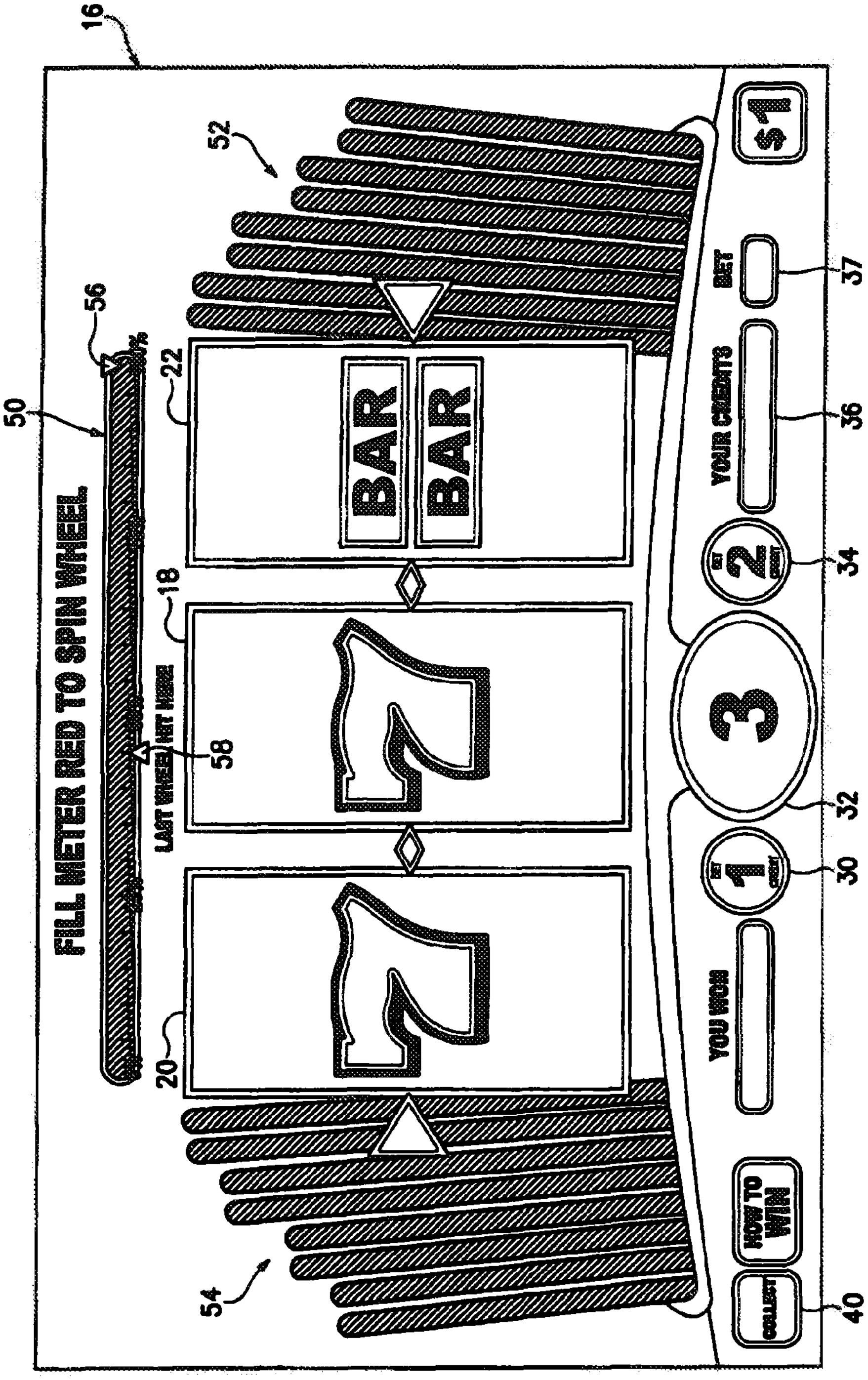

In FIG. 14, the meter has further progressed, and in this illustration, the machine has triggered play of the secondary game at the location of pointer 58 in FIG. 14. When this happens, pointer 58 and the corresponding dividing line between the red and blue images move rapidly all the way to the right, thus filling the meter with all red, as shown in FIG. 15. The player is then instructed, via display 16, to hit button 28 to play the secondary game. This initiates rotation of wheel 42, which spins and stops on a number indicating the amount of credit that then goes to the Your Credits display 36. The game is reset, as will be described, and progress begins toward the opportunity to play another secondary game.

Figure 16:
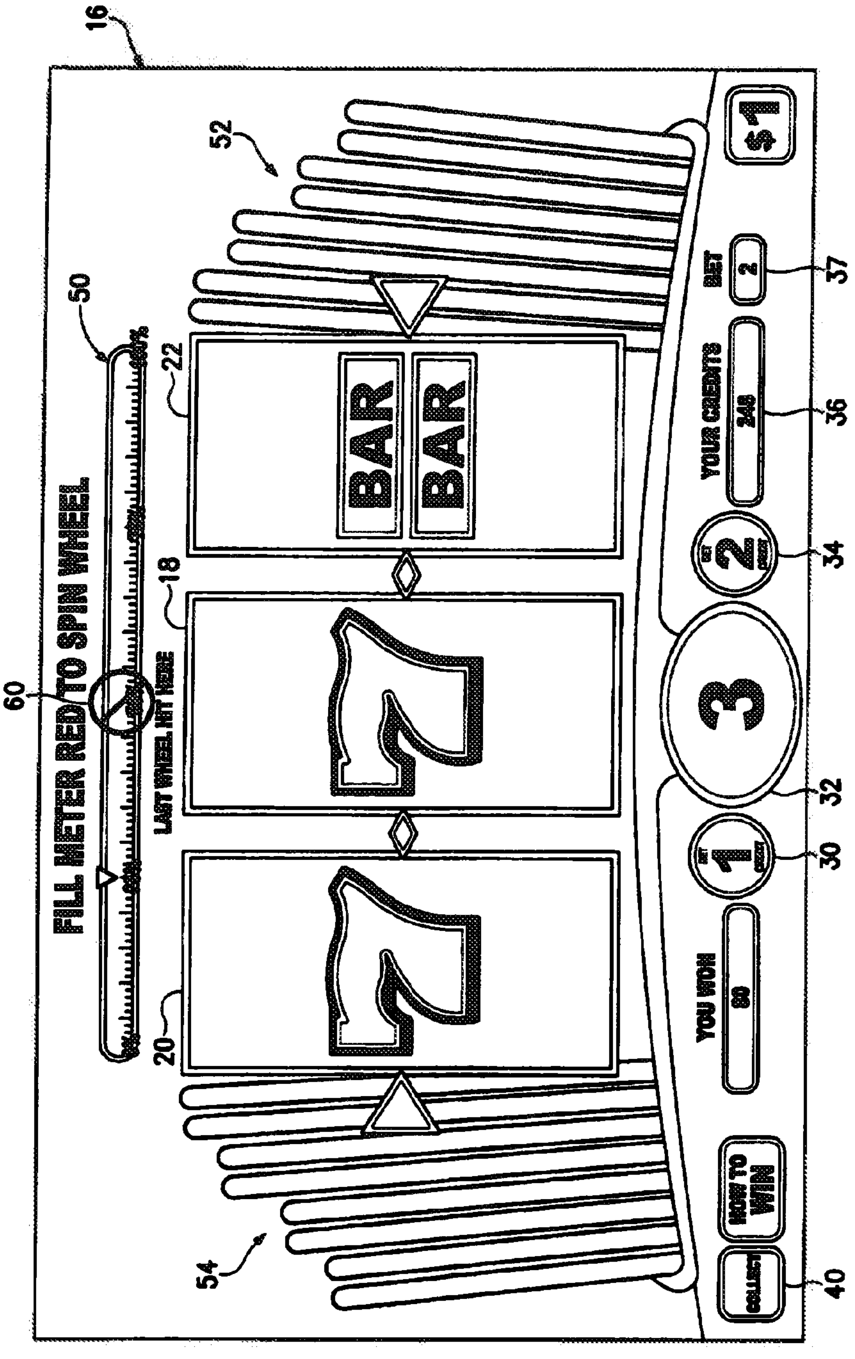

In a preferred embodiment, only a maximum credit bet (3 credits in the game depicted here), qualifies the player to play the secondary game. A bet of one or two credits will result in the player not being eligible to play the secondary game. In addition, all of the displays that indicate progress toward play of the secondary game are shown in gray, as can be seen in FIG. 16. And the rods, like rods 46, 48 (FIG. 11), also become a gray or neutral light. A symbol (a circle with a slash) 60 also appears over meter 50 to indicate that there is no eligibility nor will the progress toward the game be displayed. Alternatively, one or more of these win probability indicators may be shown even when the wager is less than the maximum possible wager. In still another implementation, only wagers that are less than a predetermined value are counted, e.g., only wagers of one credit or of one or two credits.

The term "graphical" as used herein means a pictorial representation. This could include changes in images on a display, changes in light intensity, changes in color, or a combination of the foregoing, whether or not combined with numeric, alphabetical or alphanumeric displays.

In an alternative embodiment, audio indications could be used in lieu of or in addition to graphical indications of win probability. Substantially the same controls used that are used to create graphical indications of win probability could be used to create audio indications. In other words, signals generated by the controls are applied to an audio system that provides an audio indication of the change in likelihood of awarding a bonus award.

Sometimes casinos are plagued by undesirable players, some of whom operate in teams, looking to play games only when a bonus award appears to be near. Because prior art systems, as described above, show the current value of an award and because the high end of the award is known, players may begin playing minimum credits only when the award is near. This reduces revenue from the games and potentially awards these undesirable players at the expense of patrons who generate more revenue for the casino. These undesirable players are discouraged by requiring maximum credits to be eligible for the bonus award and by preventing display of the bonus award probability when less than maximum credits are played.

Figure 17:
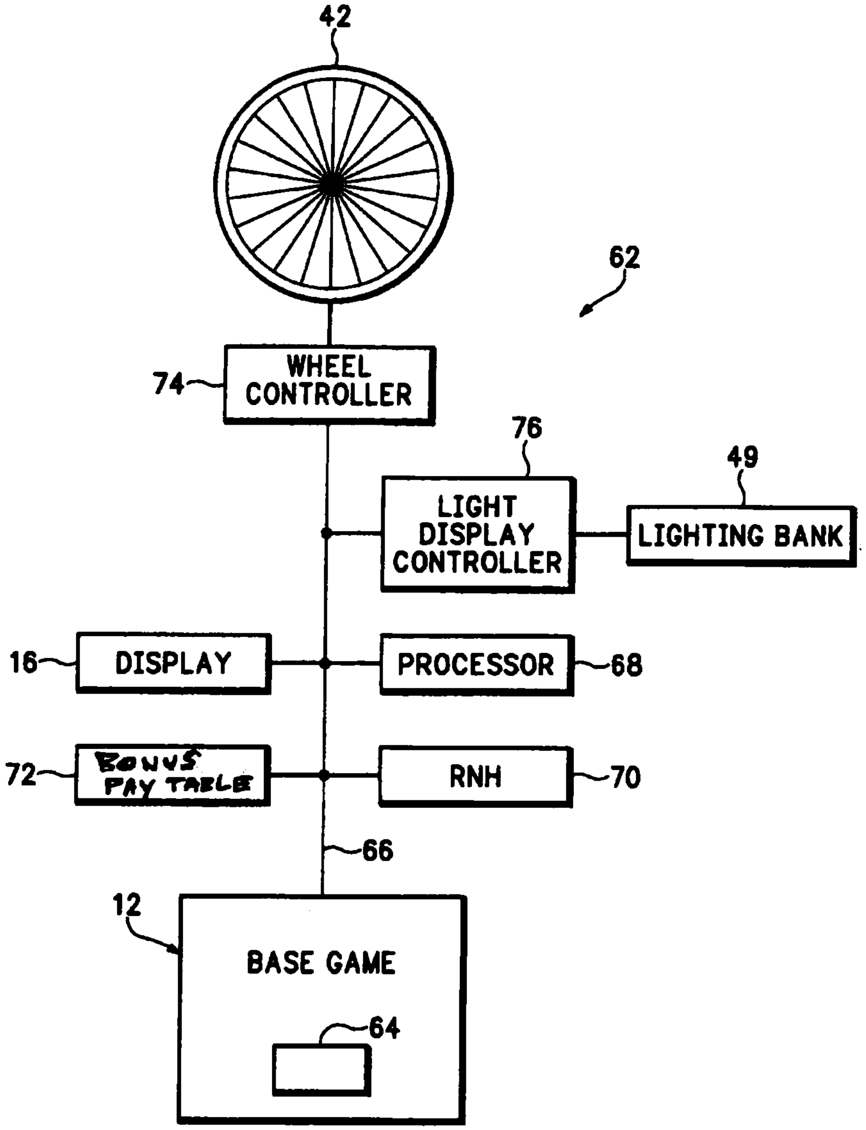
FIG. 17 is a highly schematic diagram of selected components of the game of FIG. 11.

With reference to FIG. 17, consideration will now be given to the implementation of gaming device 10. Indicated generally at 62 is a highly schematic diagram of some of the components of gaming device 10. Components that have been previously identified retain the same numeral in FIG. 17. Base game 12 includes a pay table 64 that controls the odds of producing various combinations of reel symbols 18, 20, 22 (in FIG. 11), some of which provide associated base-game awards. Control of video slot machines that implement such pay tables is well known. Although display 16 is built into the base game, inputs into the base game permit images related to the secondary game, as described above, to appear on the display along with the base-game reel symbols.

A bus 66 communicates with base game 12 and display 16. Also in communication with the bus are a processor 68, a random number generator (RNG) 70, a bonus award pay table 72, a wheel controller 74, and a light display controller 76. Processor 68 is programmed, as will be soon described, to selectively activate wheel controller 74, which in turn causes wheel 42 to spin and stop at a preselected number.

In the present embodiment, processor 68 is part of the base game. In addition to controlling the base game, additional programming, as will be explained, is implemented to control the secondary game. For example, processor 68 is programmed to trigger RNG 70, which in the present embodiment is implemented in software, upon completion of a secondary game to select a new RNG value. Bonus award pay table 72, also implemented in software in this embodiment, provides ranges associated with or not associated with the bonus award, and when the RNG value bears a predefined relationship to one of the ranges of bonus award pay table 72, processor 68 triggers the start of the next secondary game. Additional ranges in bonus award pay table 72 or additional selected RNG values could be implemented to provide additional awards via additional bonus award mechanisms. This could be an implementation in which each of the segments in wheel 42 has its own associated range, RNG value, or award as described above in connection with a different embodiment. The bonus award mechanism in the present embodiment of the invention comprises the software and associated hardware that delivers the bonus to a player.

The processor also indicates which light displays, both on display 16 and on lighting bank 49, are presented depending upon the state of game play.

In another approach, as previously described in detail with reference to FIGS. 3*g* to 3*i* above, the odds of playing the secondary game may be improved by changing the odds for a random number generator (RNG) to trigger the secondary game after each play of the base game. For example, an RNG could be programmed to have a 1/200 chance to trigger the secondary game after the first play of the base game and thereafter reduce the odds after each successive game in the following sequence: 1/199, 1/198, 1/197 . . . 1/1 until the secondary game is triggered. In a variation on this aspect, the odds might only reduce after each game to a certain level and then hold at that level for additional base games.

In another variation, the odds of winning decrease with each successive play. For example, on the first play odds of 1/10 are provided for winning the secondary bonus. On the second play, odds of 1/11, etc. Odds of winning the secondary bonus could continually increase or decrease, increase or decrease until a limit was reached or increase for a period of time and then decrease and then increase again. In addition, odds could change after one or more wagers and not change after another one or more wagers. Any such sequence of successively changing odds is useful with my invention. One of ordinary skill in the art could readily implement this variation.

Figure 18:
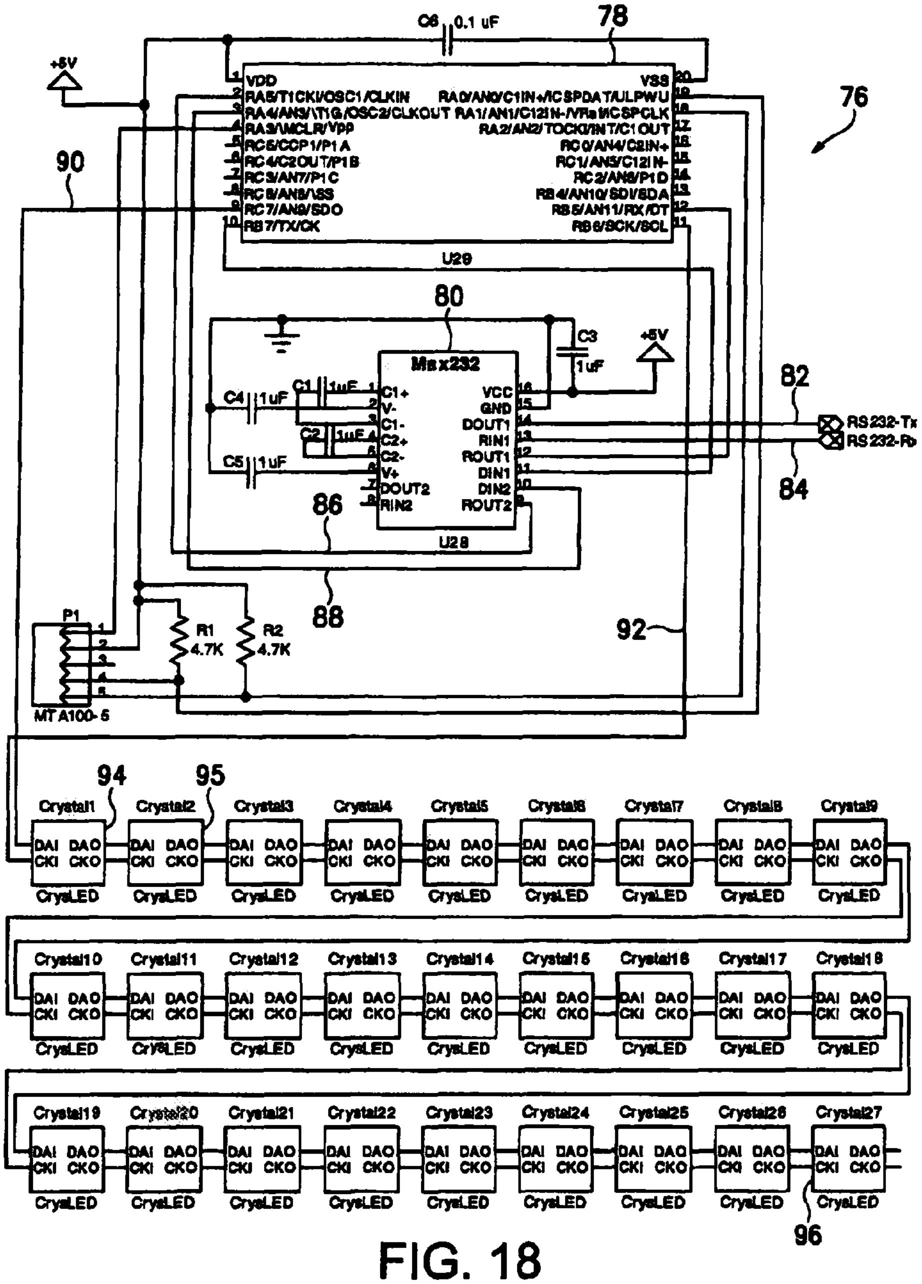
FIGS. 18-19 are schematic diagrams of a portion of the circuitry for controlling lights and displays on the game of FIG. 11.

FIG. 18 comprises a schematic diagram of light display controller 76 in FIG. 17. Light display controller 76 includes a Programmable Intelligent Computer (PIC) microprocessor 78 and an RS232 interface 80. Interface 80 communicates with processor 68 via a transmit line 82 and a receive line 84. Interface 80 in turn communicates with PIC microprocessor 78 via lines 86, 88.

The PIC microprocessor includes a serial data out (SDO) line 90 and a clock (CLK) line 92 that are connected to a light module 94, which is the first in a chain of light modules, including the next light module 59 and the last light module 96. There are a total of 27 light modules, one for each of the rods, like rods 42, 42, in light bank 49. As will soon be seen, each light module controls the light in a particular one of the rods to create a variety of lighting effects.

Figure 19:
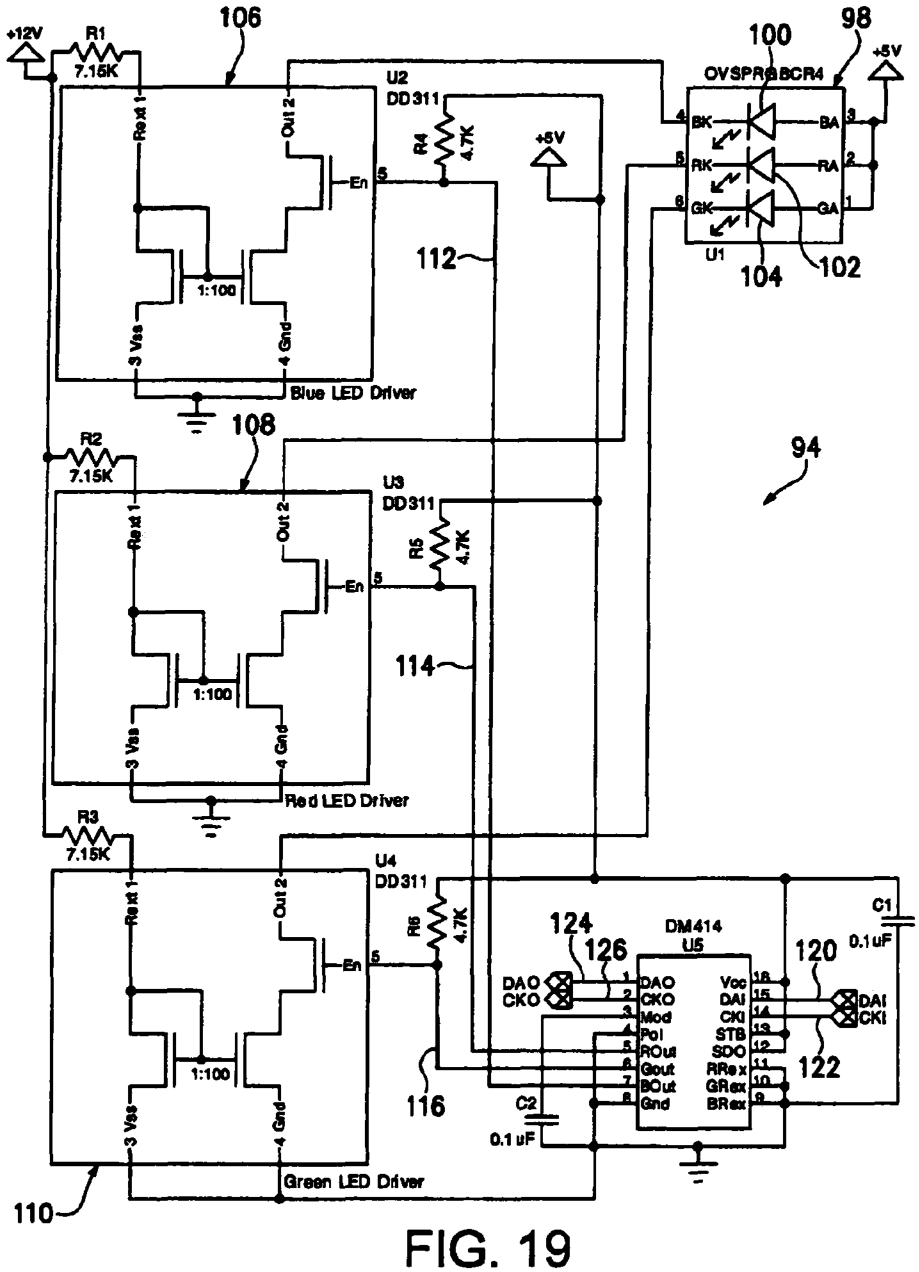

For a more detailed schematic of each of the light modules, attention is directed to FIG. 19, which depicts light module 94. Light module 94 is substantially identical to each of the other light modules. Included therein is a tri-color LED chip 98. Chip 98 includes a blue LED 100, a red LED 102, and a green LED 104. Each LED has its anode tied to +5 volts, and each cathode is driven with a separate dedicated LED driver 106, 108, 110, respectively. Each driver includes an enable line 112, 114, 116, respectively. The enable lines are driven by a chip 118 in response to data provided to the chip via data-in (DAI) terminal 120 and clock (CLK) terminal 122. The data in chip 118 may be shifted out to the next light module 95 in FIG. 18 via data-out (DAO) terminal 122 and clock (CLK) terminal 126.

The data that is transferred into each light module, like light module 94, via DAI and CLK terminals, like DAI terminal 120 and CLK terminal 122 comprises 24 bits of data, 8 bits associated with each color. Each 8 bits modulates a pulse with signal on their associated enable line, like the blue enable line 112. As a result, each color can be selected with an intensity of between 0 and 255, with 0 being off and 255 being the most intense illumination possible.

Each of tri-color LED chips is positioned at the base of a corresponding one of the rods, like rods 46, 48, in light bank 49. In the present embodiment, the rods are made from Plexiglas polymer, which conducts light into a light channel surrounded with a frosted edge. The result is a rod that glows with selected colors and intensities.

In operation, a number of pre-programmed lighting modes are stored in a memory associated with PIC microprocessor 78. These include:

PURE_SWEEP—sets all 27 rods to the same color.

GRAY—fills all rods with gray that starts at the center rod and sweeps toward the outer rods on each side in a little over a second.

REDFILL—fills all rods with blue starting at the outer rods and sweeping toward the center in a little over a second.

RANBOW_ANIM—starts with the rods set to different colors and rotates the colors from left to right.

BLUETORED—processor 68 provides a single byte with a value of 0-255 to PIC microprocessor 78, which determines the percentage of rods starting from the outside and moving toward the center) that are red. The rest of the rods are blue except for the one between the transition from red to blue, which is a combination of blue and red.

The value of the byte provided in the BLUETORED mode is related to the likelihood of initiating the secondary game. As described above this could be an indication of the probability of winning the bonus award. In addition to driving the rods, signals from light display controller 76 also control the display of meter 50 and the display of rod images 52. As a result, coordinated graphical representations of win probability are provided in a variety of ways.

Figure 20:
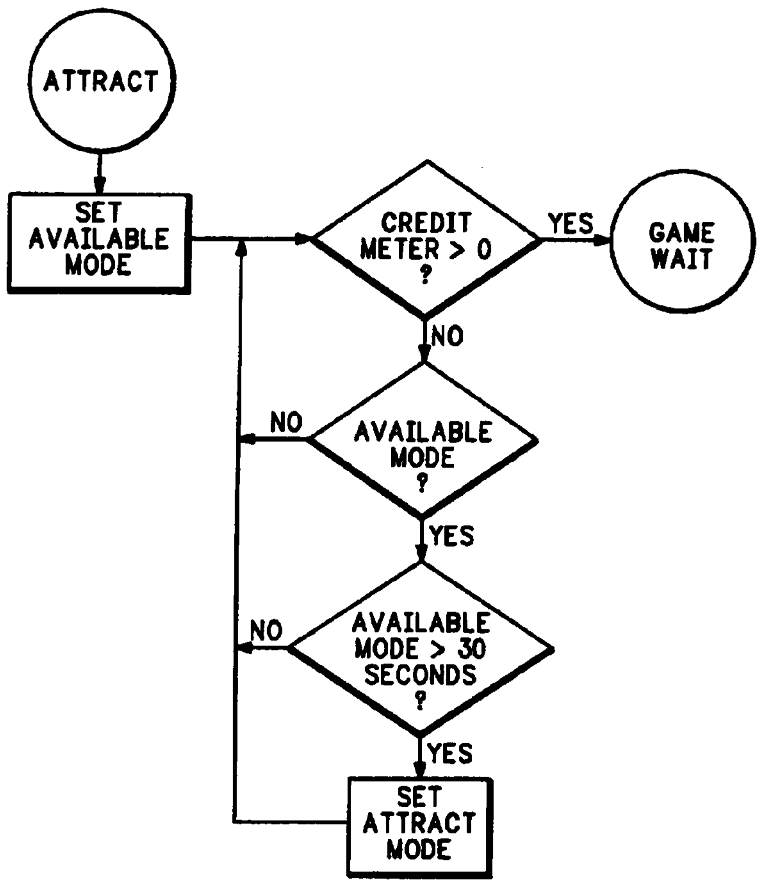
FIGS. 20-22 are flow charts that depict the behavior of lights on the game of FIG. 11 during different modes of operation.
Figure 21:
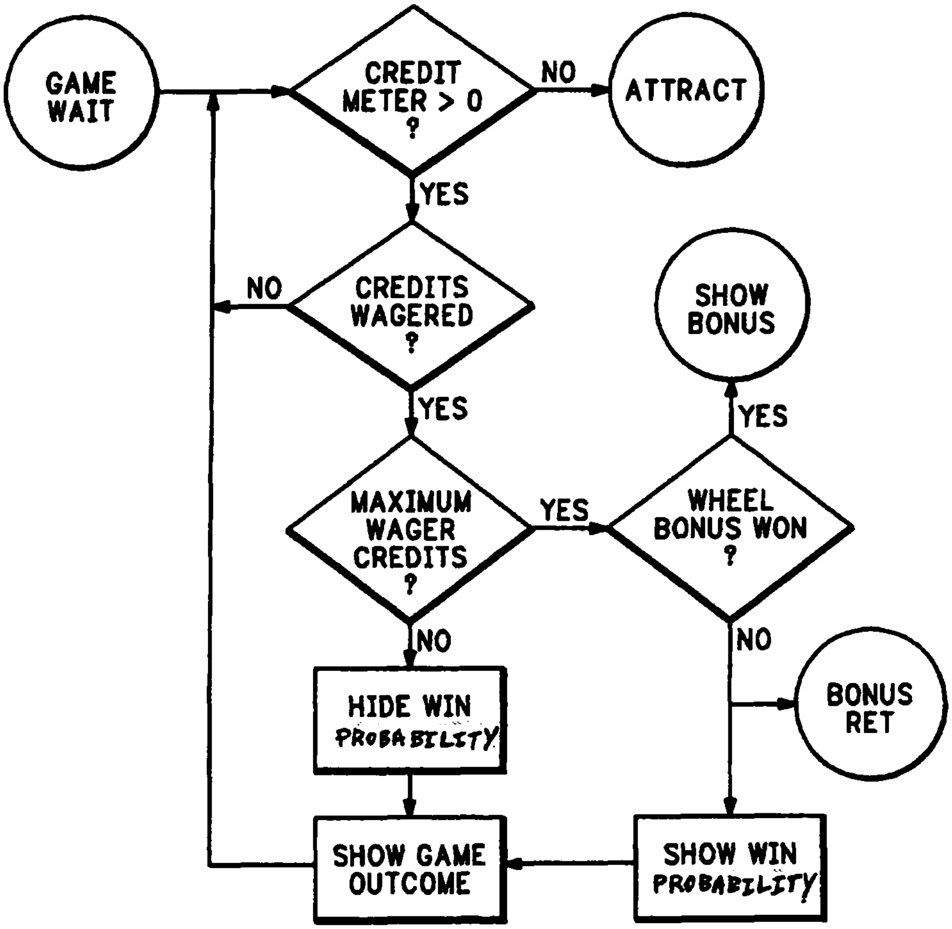
Figure 22:
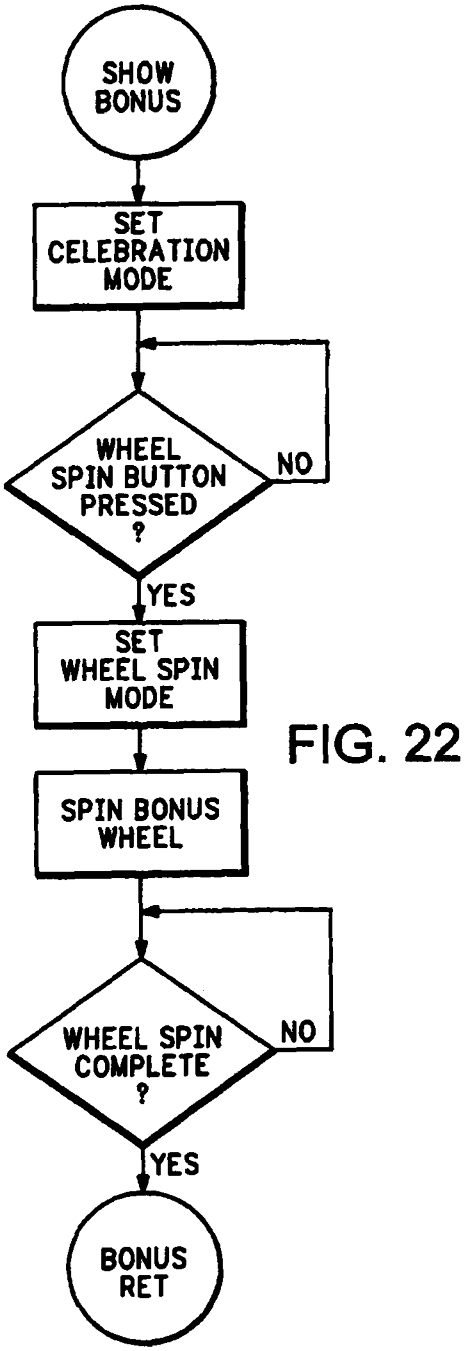

Turning now to FIGS. 20-22, consideration will be given to examples of various lighting modes during game play. In FIG. 20, when the credit meter first goes to zero, either as a result of the player cashing out or wagering his or her last credit, the lighting mode is set to Available mode for 30 seconds. In this example, available mode comprises RANBOW_ANIM, described above.

In the event that no further credits are wagered during Available mode, the lighting mode is set to Attract mode (PURE_SWEEP) until additional credits are wagered.

FIG. 21, describes lighting behavior during normal game play, i.e., when there are credits on the credit meter. For every wager less than 3 credits, the lighting mode is set to GRAY and meter 50 and rod images 52 are set as shown in FIG. 16. When 3 credits, maximum in this example, are wagered, the lighting mode is set to BLUETORED, and win probability is displayed, e.g., as shown in FIGS. 12-15. As previously mentioned, the game could be implemented to always show win probability, even in the presence of a 2 or 3 credit bet, i.e., less than the maximum.

After each maximum bet, the process depicted in FIG. 21 checks to see if the selected RNG value bears a winning relationship to a bonus award. If so, the player is given the opportunity to play the secondary game, and the process depicted in FIG. 22 is implemented.

In celebration mode, the game is programmed with celebratory audio and lighting effects. It waits for the player to press the maximum credit button, which initiates the wheel spin in this mode. Alternatively, the game could be programmed to wait a predetermined length of time for the player to press the button and then automatically enter wheel spin mode if the button has not been pressed by when the predetermined time lapsed.

Either way, wheel spin mode is entered when processor 68 instructs wheel controller 74 to spin the wheel. When the wheel spin is complete, the credits won by the player, which are indicated on the wheel segment aligned with pointer 44, are applied to the credit meter, and the process of FIG. 22 transfers control back to the process of FIG. 21. Once all the credits are off the credit meter, the process of FIG. 21 transfers control to the process of FIG. 20.

I have described above specific implementations of my invention only as examples of how implementation may be accomplished. It will be clear to one of skill in the art that my invention may be embodied in the manner described or in a range of other expressions.

The invention claimed is:

1. A method of operating a gaming device comprising:
- playing a game a first time;
- determining whether or not the game is won by selecting a value from an award pay table including at least a first range to indicate a first result and a second range to indicate a second result;
- determining whether or not the selected value bears a predefined relationship to at least one of the first and second ranges of the award pay table;
- if the selected value bears the predefined relationship, indicating on the gaming device that the game is won;
- changing the odds of winning the game by changing the size of at least one of the first and second ranges of the bonus award pay table;
- playing the game a second time; and
- determining whether or not the game is won responsive to the changed odds.

2. The method of claim 1, further comprising changing the odds of winning the game after playing the game the first time and the second time.

3. The method of claim 1, wherein changing the odds includes non-linearly changing the odds of winning the game.

4. The method of claim 1, further comprising displaying a changing probability of winning the game.

5. The method of claim 1 wherein changing the odds includes non-linearly increasing the odds of winning the bonus award.

6. The method of claim 1 wherein changing the odds includes non-linearly decreasing the odds of winning the bonus award.

7. The method of claim 1 wherein changing the odds includes increasing the odds of winning the game for one time period and decreasing the odds of winning the game for another time period.

8. The method of claim 1 wherein changing the odds includes changing the odds after at least one wager and not changing the odds after another wager.

9. A method of operating a gaming device comprising:
- determining a win on the gaming device to be associated with at least one value Z selected from a plurality of values Y;
- receiving an input to initiate a game on the gaming device;
- selecting one value X from the plurality of values Y;
- determining whether or not the selected value X bears a predefined relationship to that at least one value Z;
- if the selected value X bears the predefined relationship, indicating on the gaming device that the game is won;
- changing the number of the plurality of values Y;
- playing the game a second time; and
- determining whether or not the game is won.

* * * * *